(12) United States Patent
Raj et al.

(10) Patent No.: US 12,506,932 B2
(45) Date of Patent: *Dec. 23, 2025

(54) METHODS, SYSTEMS, APPARATUSES, AND DEVICES FOR PROVIDING CONTENT TO VIEWERS FOR ENHANCING WELL BEING OF THE VIEWERS

(71) Applicants: Tarun Sunder Raj, Santa Monica, CA (US); Benjamin Tucker, Yakima, WA (US)

(72) Inventors: Tarun Sunder Raj, Santa Monica, CA (US); Benjamin Tucker, Yakima, WA (US)

( * ) Notice: Subject to any disclaimer, the term of this patent is extended or adjusted under 35 U.S.C. 154(b) by 536 days.

This patent is subject to a terminal disclaimer.

(21) Appl. No.: 17/843,647

(22) Filed: Jun. 17, 2022

(65) Prior Publication Data

US 2022/0321964 A1  Oct. 6, 2022

Related U.S. Application Data

(63) Continuation-in-part of application No. 17/196,536, filed on Mar. 9, 2021, now Pat. No. 11,368,235, which is a continuation-in-part of application No. 15/654,581, filed on Jul. 19, 2017, now Pat. No. 10,945,014.

(60) Provisional application No. 62/364,146, filed on Jul. 19, 2016.

(51) Int. Cl.
*H04N 21/466* (2011.01)
*H04N 21/45* (2011.01)
*H04N 21/462* (2011.01)

(52) U.S. Cl.
CPC ..... *H04N 21/4668* (2013.01); *H04N 21/4532* (2013.01); *H04N 21/4622* (2013.01)

(58) Field of Classification Search
None
See application file for complete search history.

(56) References Cited

U.S. PATENT DOCUMENTS

2011/0142413 A1\* 6/2011 Kang ................... G06F 16/437
  348/E5.002
2012/0195460 A1  8/2012 Inigo
2012/0324492 A1\* 12/2012 Treadwell, III ........ H04H 60/45
  725/10

(Continued)

FOREIGN PATENT DOCUMENTS

WO  WO2014130329 A1  8/2014

*Primary Examiner* — Mushfikh I Alam

(57) ABSTRACT

Disclosed herein is a method for providing content to viewers for enhancing wellbeing of the viewers, in accordance with some embodiments. Accordingly, the method comprises receiving a media content, receiving a broadcaster preference comprising a viewer context variable, generating an augmentation content for the enhancing of the wellbeing of a viewer based on the viewer context variable and the media content, transmitting the augmented media content to a viewer device. Further, the viewer device presents the augmented media content to the viewer based on a viewer context value corresponding to the viewer context variable corresponding to a viewer sensor comprised in the viewer device. Further, the viewer sensor generates the viewer context value based on detecting a response of the viewer corresponding to the augmented media content.

16 Claims, 19 Drawing Sheets

(56) References Cited

U.S. PATENT DOCUMENTS

| | | | |
|---|---|---|---|
| 2013/0160046 A1* | 6/2013 | Panje | H04N 21/43637 |
| | | | 725/32 |
| 2014/0365349 A1* | 12/2014 | Kennon | H04L 67/10 |
| | | | 715/753 |
| 2015/0058123 A1 | 2/2015 | Lenahan | |
| 2015/0120648 A1 | 4/2015 | Slovacek | |
| 2016/0014461 A1* | 1/2016 | Leech | H04N 21/4668 |
| | | | 725/14 |
| 2016/0180590 A1 | 6/2016 | Kamhi | |
| 2016/0253710 A1* | 9/2016 | Publicover | H04W 4/21 |
| | | | 705/14.66 |
| 2016/0367193 A1* | 12/2016 | Zhang | A61B 5/1032 |
| 2016/0381110 A1* | 12/2016 | Barnett | H04L 67/306 |
| | | | 709/231 |
| 2017/0302979 A1* | 10/2017 | Kaya | H04N 21/234 |
| 2020/0019371 A1* | 1/2020 | Rando | H04N 21/42201 |
| 2020/0037027 A1* | 1/2020 | Kline | H04N 21/4532 |
| 2021/0136448 A1* | 5/2021 | Ramirez | H04H 60/33 |
| 2021/0274318 A1* | 9/2021 | Matic | H04N 21/42201 |
| 2023/0038347 A1* | 2/2023 | Rajanna | H04N 21/4882 |
| 2023/0224539 A1* | 7/2023 | Murugan | H04N 21/44218 |
| | | | 725/12 |

* cited by examiner

METHODS, SYSTEMS, APPARATUSES, AND DEVICES FOR PROVIDING CONTENT TO VIEWERS FOR ENHANCING WELL BEING OF THE VIEWERS

FIELD OF THE INVENTION

Generally, the present disclosure relates to the field of data processing. More specifically, the present disclosure relates to methods, systems, apparatuses, and devices for providing content to viewers for enhancing wellbeing of the viewers.

BACKGROUND OF THE INVENTION

Existing techniques for providing content to viewers for enhancing wellbeing of the viewers are deficient in regard to several aspects. For instance, current technologies do not consider viewers' responses during presenting the content. Furthermore, current technologies do not consider viewers' biometrics during presenting the content. Moreover, current technologies do not use viewers' health profiles for generating content.

Therefore, there is a need for methods, systems, apparatuses, and devices for providing content to viewers for enhancing wellbeing of the viewers that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for providing content to viewers for enhancing wellbeing of the viewers, in accordance with some embodiments. Accordingly, the method may include a step of receiving, using a communication device, a media content from a broadcaster device. Further, the method may include a step of receiving, using the communication device, at least one broadcaster preference from the broadcaster device. Further, the at least one broadcaster preference may include at least one viewer context variable. Further, the method may include a step of generating, using a processing device, an augmented media content for the enhancing of the wellbeing of a viewer based on the at least one viewer context variable and the media content. Further, the augmented media content may include a layered content. Further, the method may include a step of transmitting, using the communication device, the augmented media content to a viewer device. Further, the viewer device may include a receiver device associated with a receiver. Further, the viewer may include the receiver. Further, the viewer device may be configured for presenting the augmented media content to the viewer. Further, the presenting of the augmented media content on the viewer device may be based on at least one viewer context value corresponding to the at least one viewer context variable. Further, the at least one viewer context variable corresponds to at least one viewer sensor comprised in the viewer device. Further, the at least one viewer sensor may be configured for generating the at least one viewer context value for the at least one viewer context variable based on detecting a response of the viewer corresponding to the augmented media content. Further, the method may include a step of transmitting, using the communication device, the augmented media content to the broadcaster device.

Further disclosed herein is a system for providing content to viewers for enhancing wellbeing of the viewers, in accordance with some embodiments. Accordingly, the system may include a communication device and a processing device. Further, the communication device may be configured for receiving a media content from a broadcaster device. Further, the communication device may be configured for receiving at least one broadcaster preference from the broadcaster device. Further, the at least one broadcaster preference may include at least one viewer context variable. Further, the communication device may be configured for transmitting an augmented media content to a viewer device. Further, the viewer device may be configured for presenting the augmented media content to a viewer. Further, the viewer device may include a receiver device associated with a receiver. Further, the viewer may include the receiver. Further, the presenting of the augmented media content on the viewer device may be based on at least one viewer context value corresponding to the at least one viewer context variable. Further, the at least one viewer context variable corresponds to at least one viewer sensor comprised in the viewer device. Further, the at least one viewer sensor may be configured for generating the at least one viewer context value for the at least one viewer context variable based on detecting a response of the viewer corresponding to the augmented media content. Further, the communication device may be configured for transmitting the augmented media content to the broadcaster device. Further, the processing device may be communicatively coupled with the communication device. Further, the processing device may be configured for generating the augmented media content for the enhancing of the wellbeing of the viewer based on the at least one viewer context variable and the media content. Further, the augmented media content may include a layered content.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
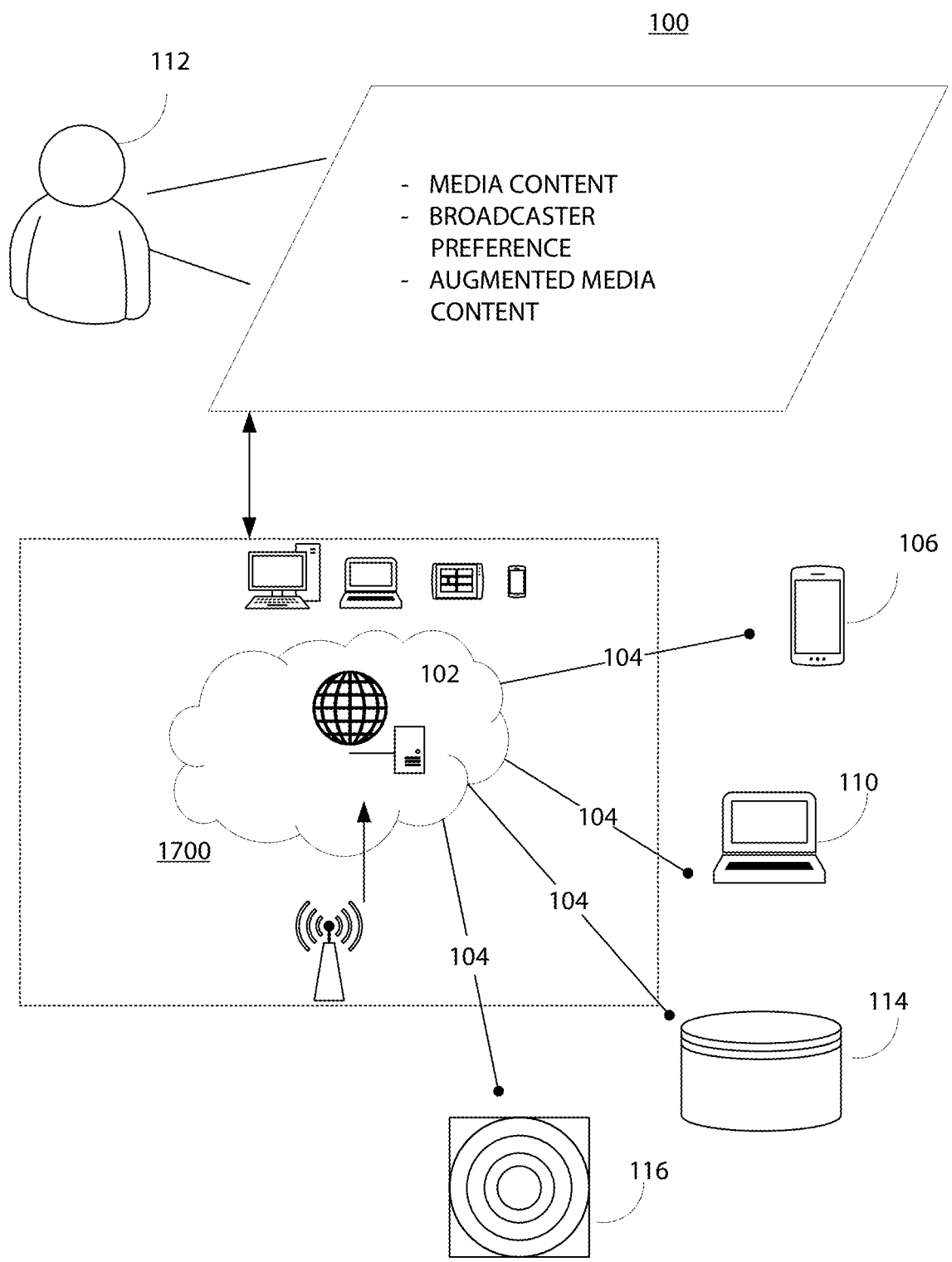
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for providing content to viewers for enhancing wellbeing of the viewers, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer or a decentralized group of processors. Similarly, one or more steps of the method may be performed by a client computer. Likewise, one or more steps of the method may be performed by an intermediate entity such as, for example, a proxy server, a neural network, a Machine Learning and Artificial Intelligence, etc. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data there between corresponding to one or more steps of the method. For example, in a client-server environment, sensitive data corresponding to a user may not be allowed to be transmitted to the server computer. Further, another objective may be to combine to synchronize a generative or preprogrammed plurality of data for an output into software and hardware devices. Accordingly, one or more steps of the method operating on the sensitive data and/or a derivative thereof may be performed at the client device.

Overview:

The present disclosure describes methods, systems, apparatuses, and devices for providing content to viewers for enhancing wellbeing of the viewers. Further, the present disclosure describes utilizing vibrational health records which take biometric and API data and store it in different methods including blockchain in order to determine hardware programming and generative content for health, therapy, or entertainment in mixed reality and media on any device. Further, the present disclosure utilizes machine learning and AI combined with active user data, trends, historical preferences, and existing databases.

Further, the present disclosure describes capturing biometrics and programmatically developing direct biofeedback treatments using audio, visual, and haptic/vibrotactile hardware and software, other sensory devices, implant devices, wearable devices, etc. Further, the present disclosure describes AI, related as the contextualization and processing, decision making neural net, and personal response of viewers. Further, the present disclosure describes the vibrational health record which is generated from the biometrics and preferences or external data sources on the blockchain.

Consistent with embodiments of the present disclosure, an online platform (also referred to herein as "platform" or media augmentation platform) for facilitating augmentation of media content, such as, for example, video, audio, multimedia, Virtual Reality (VR) content, etc. may be provided. This overview is provided to introduce a selection of concepts in a simplified form that are further described below. This overview is not intended to identify key features or essential features of the claimed subject matter. Nor is this overview intended to be used to limit the claimed subject matter's scope. The online platform may be used by individuals or companies to facilitate augmentation of media content.

In some embodiments, the present disclosure provides a live and prerecorded contextual video engagement system, which pulls in all available data from web or open frequency sources to allow a user to annotate and augment their own content in real-time.

If surrounding information can be used for an annotation, it is placed into the user's video editing dashboard in real-time. Known as Augmented Snapshot, these items can either be inserted into the timeline or on top of live or pre-recorded content. If the augmented content the user would like to use is not available, the user can insert a query or conditional statement. Therefore, when the content is viewed it pulls the augmented content most relevant to that viewer as designated by the broadcaster. This includes, but is not limited to: connected devices, supplemental media, personal and user information, location, time, trends, tags, social media, and e-commerce listings.

Accordingly, in an instance, when a snapshot is taken, an encoding server breaks down each input data comprising video into frames and utilizes local and cloud server processes along with a layer of API connections to analyze each frame for possible interactive elements. Further, taking the snapshot may include capturing a moment in time or a length of time from the input data. The broadcaster can use either a manual or automated process to place tracking and interaction points on people or items. The automated process connects with any data source which can provide relevant data for interaction points. This includes, but is not limited to, facial and image recognition databases, health databases, heat mapping, data from web crawlers, ad networks, content publishers comprising music or video streaming, feeds, plugins, tags, promotions, user and device data, or environmental and GPS data sources. Administrators, broadcasters and viewers can add and toggle the augmented viewing modes which are most useful to them. Results from these processes are used to insert the most logical interaction points and preprogrammed or generative content for augmented content, sign up options, relevant locations, social media, purchasing opportunities and other user data. This information is filtered for use by analyzing the metadata and preferences of the broadcaster, using that as a live query to pull in more relevant data from the contextual and user input systems. The control of this data is done with the System and User filters and the Snapshot.

Through the present invention all interactive elements are stored in a transmittable, digital interactive content container. Each container may have interaction points defined by the broadcaster or the viewer as determined by the decoding server. Viewers can utilize the available synchronized generative and aggregated data (such as live Augmented Reality (AR) data) to create their own snapshot additions to the content using interactive hotspots, input data, and media streams, they create.

For live broadcast, information and category prompts for the AR broadcast display will be selected ahead of time and can be triggered by the broadcaster or set ahead of time. These elements will be received by the viewer, then searched or filtered based on their interests. Interactive containers can be sent as links, embedded on pages, assigned to specified actions, activated by context or broadcasted across a large network of publishers. Viewer modes and filters are made available based on the contextually aware data coming from the APIs and information sources.

These viewing filters/modes may be switched between, showing only the relevant interactivity. The switching process is similar to how one may switch between video and camera mode on an iPhone. To provide the fastest and most optimum experience, the default viewing mode is based on the commonalities between the broadcaster's and viewer's preferences.

All activity is cataloged and cookied for transparent user history data controls. At any point, the viewer can see what information has been stored about them and their patterns. In real-time, they can change, add to, or remove this preference data to create more accurate recommendations and profiles for their ongoing experience. The system constantly crawls available data sources, identifies interactive file types and information, then presents new interactive options to both the broadcasters and viewer.

As advertisers and content creators place their promotions on the system, viewer activity and preferences create an unprecedented transparency and accuracy allow for true utility in the promotional process. This personalization allows for the system to provide contextually aware auto-response messages, data and coupons back to the viewer. The broadcaster can customize the graphics and number of redemptions of each coupon they create on the dashboard. This system is a self-contained, hyper-intelligent content creation, management, marketing and media platform which dramatically minimizes the number of clicks required to engage each end viewer. The broadcaster also has access to the most data available; viewing patterns, hot spots, mouse movements, social trends, social graphs, opt-ins and interaction history. The recommendation system works for both broadcaster and viewer, helping to determine the most effective interactions and methods to communicate the intended message. This system takes advantage of as many emerging technologies and data sources possible in order to deliver the most personalized and real-time, interactive experience available.

Further, the present disclosure describes a first method of providing augmented media. The first method may include receiving, using a communication unit, a media content from a broadcaster device. Further, the first method may include receiving, using the communication unit, at least one broadcaster preference from the broadcaster device. Further, the broadcaster preference may include at least one viewer context variable. Further, the first method may include retrieving, using the communication unit, a plurality of augmentation content from at least one database based on the at least one broadcaster preference. Further, the first method may include transmitting, using the communication unit, the plurality of augmentation content to the broadcaster device. Further, the broadcaster device may be configured to present the plurality of augmentation content. Further, the first method may include receiving, using the communication unit, a selection of at least one augmentation content from the broadcaster device. Further, the first method may include embedding, using a processing unit, each of the at least one augmentation content and the at least one viewer context variable in the media content to obtain an augmented media content. Further, presenting of the augmented media content on a viewer device may be based on at least one viewer context value corresponding to the at least one viewer context variable. Further, the at least one viewer context value may be associated with the viewer device. Further, the first method may include transmitting, using the communication unit, the augmented media content to the broadcaster device.

Further, the present disclosure describes a second method of providing augmented media content. The second method may include receiving, using the processing unit, at least one broadcaster preference. Further, the second method may include receiving, using a processing unit, a media content from a media source. Further, the second method may include analyzing, using the processing unit, the media content. Further, the second method may include identifying, using the processing unit, at least one interaction element in the media content based on the analyzing. Further, the second method may include identifying, using the processing unit, at least one augmentation content based on each of the at least one interaction element and the at least one broadcaster preference. Further, the second method may include embedding, using the processing unit, the at least one augmentation content in the media content to obtain an augmented media content. Further, the second method may include transmitting, using a communication unit, the augmented media content to a viewer device. Further, the viewer device may be configured to present the media content. Further, the viewer device may be associated with at least one viewer preference and at least one viewer contextual data. Further, presenting of the at least one augmentation content may be based on the at least one viewer preference and the at least one viewer contextual data.

Further, the present disclosure describes a third method of providing augmented media content. The third method may include receiving, using a communication unit, a media content from a broadcaster device. Further, the third method may include receiving, using the communication unit, at least one broadcaster contextual data from the broadcaster device. Further, the at least one broadcaster contextual data may be associated with one or more of the media content and a broadcaster associated with the user device. Further, the third method may include analyzing, using a processing unit, one or more of the media content and the at least one broadcaster contextual data. Further, the third method may include identifying, using the processing unit, a plurality of augmentation content based on the analyzing. Further, the third method may include transmitting, using the communication unit, the plurality of augmentation content to the broadcaster device. Further, the third method may include receiving, using the communication unit, a selection of at least one augmentation content from the plurality of augmentation content. Further, the third method may include embedding, using the processing, one or more of the at least one augmentation content in the media content to obtain an augmented media content. Further, the third method may include transmitting, using the communication unit, the augmented media content to the broadcaster device.

Further, the present disclosure describes a system for providing augmented media. The system may include a communication unit configured for receiving a media content from a broadcaster device. Further, the communication unit may be configured for receiving at least one broadcaster preference from the broadcaster device. Further, the broadcaster preference may include at least one viewer context variable. Further, the communication unit may be configured for retrieving a plurality of augmentation content from at least one database based on the at least one broadcaster preference. Further, the communication unit may be configured for transmitting the plurality of augmentation content to the broadcaster device. Further, the broadcaster device may be configured to present the plurality of augmentation content. Further, the system may include receiving a selection of at least one augmentation content from the broadcaster device. Further, the system may include transmitting the augmented media content to the broadcaster device. Further, the system may include a processing unit configured for embedding each of the at least one augmentation content and the at least one viewer context variable in the media content to obtain an augmented media content. Further, presenting of the augmented media content on a viewer device may be based on at least one viewer context value corresponding to the at least one viewer context variable. Further, the at least one viewer context value may be associated with the viewer device.

Further, the present disclosure describes a software application that intakes signals and splits them into the different outputs of light, sound, and vibration which are defined as having a programmable pulse width, amplitudes, frequencies, and modulation depths in addition to the standard music player functions. It saves these to a read/write format (.json). Further, the software synchronizes all these elements based on the ideal wellness program and provides seamless integration of music combined with the frequencies to a proprietary file format (.JSON+MUSIC FILE=.LSV). Further, the proprietary file format is a programmatic sequencing of live or predetermined oscillators combined with timed music and visuals in a proprietary way. Further, the signals may be included the media content transmitted from a broadcaster device associated with a broadcaster. Further, the broadcaster device 1002 may be associated with a broadcaster. Further, the broadcaster may be an artificial intelligence (AI) entity. Further, the augmented media content which is generated has the proprietary file format (.LSV).

Further, the present disclosure describes a hardware device that takes analog/digital signals and split them into the various output channels in a synchronized way.

FIG. 1 is an illustration of an online platform 100 consistent with various embodiments of the present disclosure. By way of non-limiting example, the online platform 100 to provide content to viewers for enhancing wellbeing of the viewers may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

The platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 100 may be hosted on a centralized server, such as, for example, a cloud computing service. Although methods 700 and 800 have been described to be performed by a computing device 1700, it should be understood that, in some embodiments, different operations may be performed by different networked elements in operative communication with computing device 1700.

Embodiments of the present disclosure may comprise a system having a memory storage and a processing unit. The processing unit coupled to the memory storage, wherein the processing unit is configured to perform the stages of methods 700 and 800.

A user 112, such as the one or more relevant parties, may access online platform 100 through a web based software application or browser. The web based software application may be embodied as, for example, but not be limited to, a website, a web application, a desktop application, and a mobile application compatible with a computing device 1700.

Accordingly, in an instance, the user 112, such as a broadcaster may access the platform in order to generate augmented media content. For instance, the broadcaster may provide a media content by either uploading the media content to the platform or providing a hyperlink to the media content. Accordingly, the platform may receive the media content. Further, the broadcaster may provide one or more broadcaster preferences which generally control augmentation of the media content. For example, the broadcaster preferences in general may determine what portion of the media content is to be augmented, which augmentation content is to be selected, how the augmentation is to be performed, to whom the augmented content is to be presented and how the augmented content is to be presented etc. Accordingly, in an instance, the broadcaster may specify one or more context variables (and associated one or more contextual values) based on which the augmentation content may be identified. The one or more contextual variables may be associated with the broadcaster and/or one or more viewers and/or one or more viewer devices. Accordingly, in an instance, the platform may communicate with one or more sensors 116 in order to determine one or more current values corresponding to the one or more contextual variables. Based on a match between the one or more current values with the one or more values specified by the broadcaster, augmentation content may be identified. Further, the online platform may perform content analysis of the media content in order to determine one or more interaction elements (e.g. people, places, brands, etc.). Accordingly, augmentation content identified by the platform may be based on the one or more interaction elements.

Further, in an instance, the augmentation content identified by the platform may be presented to the broadcaster. Accordingly, the broadcaster may provide a confirmation on the augmentation content. Alternatively, in some instances, multiple augmentation content may be presented to the broadcaster and the broadcaster may be enabled to select one or more augmentation content. Further, augmentation content confirmed and/or selected by the broadcaster may then be embedded in the media content to obtain an augmented media content. Such embedding may be performed either based on including the augmentation content per se and/or an indication (e.g. hyperlinks) associated with the augmentation content. In addition, in some instances, the augmented media content may also include the one or more broadcaster preferences. Accordingly, in an instance, when the augmented media content is being played at a viewer device, one or more current values associated with the one or more contextual variables specified in the broadcaster preferences may be determined. Further, a comparison of the one or more current values with the one or more values specified in the broadcaster preferences may be performed. Accordingly, based on a result of the comparison, further filtering of the augmentation content may be performed. As a result, a customized augmented content may be provided to viewers. In addition, in some embodiments, the augmentation content presented to viewers may be based on viewer preferences. Additionally, the online platform may be configured to receive viewer interaction data representing interaction of viewers with the augmented media content. Accordingly, the online platform may control further augmentation of media content based on the viewer interaction data. As a result, the online platform may be configured to discover patterns or trends in viewer behavior and accordingly adapt augmentation of media content.

Although methods 700 and 800 have been described to be performed by platform 100, it should be understood that computing device 1700 may be used to perform the various stages of methods 700 and 800. Furthermore, in some embodiments, different operations may be performed by different networked elements in operative communication with computing device 1700. For example, a server may be employed in the performance of some or all of the stages in methods 700 and 800. Moreover, the server may be configured much like computing device 1700.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of the methods 700 and 800 will be described in greater detail below.

Figure 7:
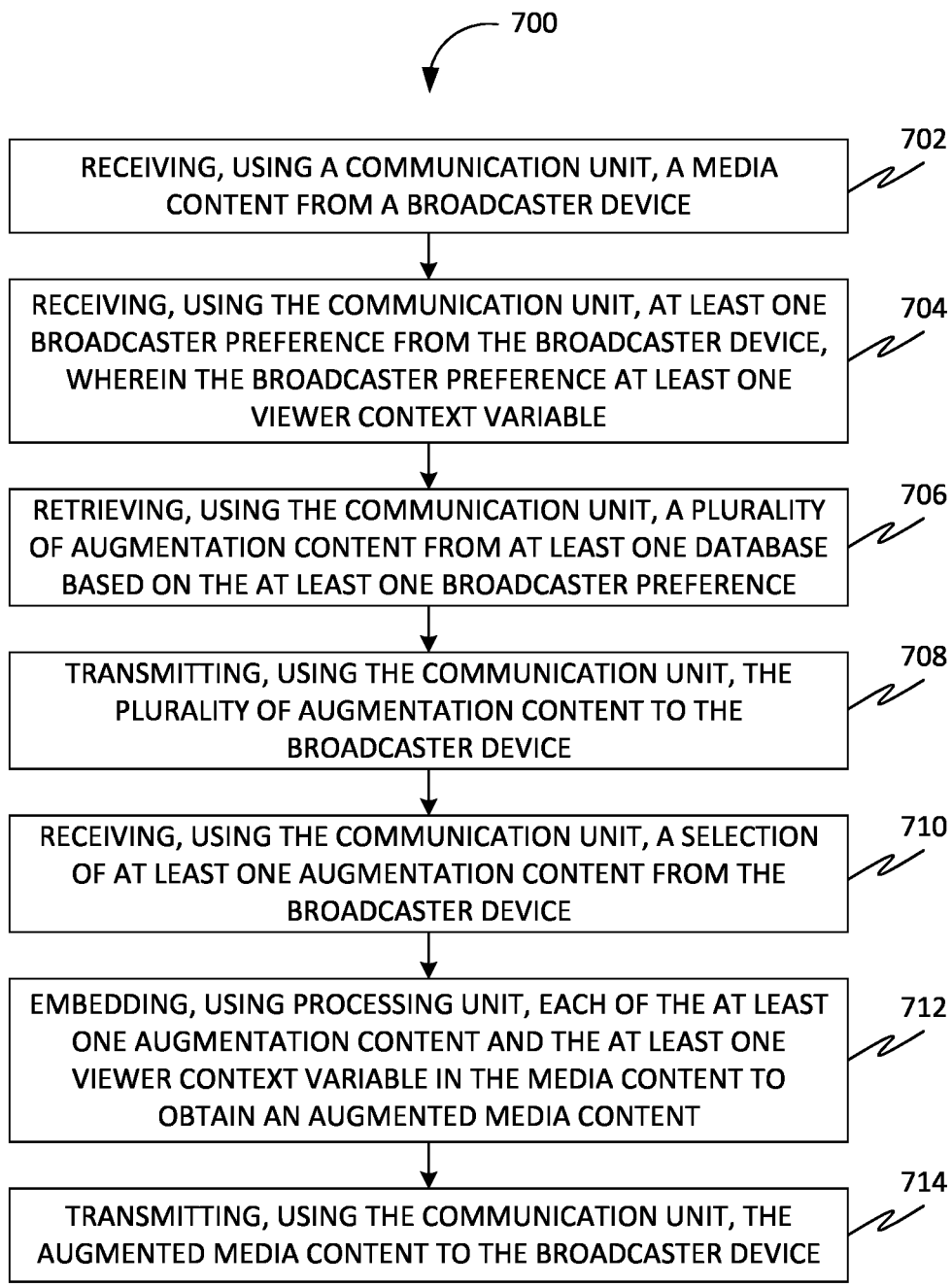
FIG. 7 illustrates a flowchart of a method of generating augmented media content, in accordance with some embodiments.

FIG. 7 illustrates a method 700 of providing augmented media content, in accordance with some embodiments. The method 700 may include receiving, using a communication unit, a media content from a broadcaster device. Further, the method 700 may include receiving, using the communication unit, at least one broadcaster preference from the broadcaster device. Further, the broadcaster preference may include at least one viewer context variable. Accordingly, the broadcaster may specify what context variables at a viewer device determine augmentation content. For example, the broadcaster may specify that augmentation content is to be presented based on time, location, sensor data, user characteristics etc. associated with the viewer device.

Further, the method 700 may include a stage 706 of retrieving, using the communication unit, a plurality of augmentation content from at least one database based on the at least one broadcaster preference. Accordingly, in an instance, the at least one database may be associated with third party systems that are in communication with the online platform.

Further, the method 700 may include a stage 708 of transmitting, using the communication unit, the plurality of augmentation content to the broadcaster device. Further, the broadcaster device may be configured to present the plurality of augmentation content. Further, the method 700 may include a stage 710 of receiving, using the communication unit, a selection of at least one augmentation content from the broadcaster device. Accordingly, the plurality of augmentation content may be viewed by a user (i.e. broadcaster) of the broadcaster device prior to making a selection of one or more augmentation content. In some embodiments, the plurality of augmentation content may include links that may enable the broadcaster device to retrieve the plurality of augmentation content from corresponding one or more databases hosting the plurality of augmentation content.

Further, the method 700 may include a stage 712 of embedding, using a processing unit, each of the at least one augmentation content and the at least one viewer context variable in the media content to obtain an augmented media content. Further, presenting of the augmented media content on a viewer device may be based on at least one viewer context value corresponding to the at least one viewer context variable. Further, the at least one viewer context value may be associated with the viewer device. Further, the method 700 may include a stage 714 of transmitting, using the communication unit, the augmented media content to the broadcaster device.

Further, in some embodiments, the augmented media content delivered to the viewer device may subsequently used by the viewer for further augmenting a part or the whole of the augmented media content as described in conjunction with FIG. 7. Accordingly, in this instance, the viewer device may function as the broadcaster device and the viewer may function as the broadcaster. As a result, users of the platform may successively share augmented media content among themselves that may be generated from one or more executions of media content augmentation as outlined in FIG. 7. In other words, the online platform may facilitate a peer-to-peer exchange of augmented media content between a first user and a second user with one or more augmentations applied prior to each exchange.

In some embodiments, the method 700 may further include receiving, using the communication unit, at least one broadcaster context value corresponding to at least one broadcaster context variable from the broadcaster device. Further, the retrieving of the plurality of augmentation content may be further based on the at least one broadcaster context value. Accordingly, contextual variables of the broadcaster device may also be used to determine relevant augmentation content to be retrieved and embedded into the media content.

In some embodiments, the at least one broadcaster context variable corresponds to at least one broadcaster sensor comprised in the broadcaster device. Further, the at least one viewer context variable corresponds to at least one viewer sensor comprised in the viewer device. Accordingly, in some embodiments, one or more sensors (for sensing motion, orientation, speed etc.) present in the broadcaster device and viewer device may determine the augmentation content to be retrieved/presented.

In some embodiments, the method 700 may further include analyzing, using the processing unit, the media content. Additionally, the method 700 may include identifying, using the processing unit, at least one interaction element in the media content based on the analyzing. Further, the retrieving of the plurality of augmentation content may be further based on the at least one interaction element.

In some embodiments, the method 700 may further include receiving, using the communication unit, viewer interaction data from the viewer device. Further, the viewer interaction data represents interaction of a viewer with the viewer device in association with the augmented content presented on the viewer device. Further, the retrieving of the plurality of augmentation content may be further based on the viewer interaction data.

In some embodiments, the augmented media content may include a plurality of augmented media contents. Accordingly, the viewer interaction data may correspond to a first augmented media content presented at a first time, whereas a second augmented media content may be retrieved based on the viewer interaction data and presented at a second time (later than the first time). Similarly, in some embodiments, the viewer device may include a plurality of viewer devices. Accordingly, interaction data received from a first viewer device may be used to retrieve an augmentation content for presentation on a second viewer device.

In some embodiments, the method 700 may further include receiving, using the communication unit, at least one viewer preference from the viewer device. Further, the retrieving of the plurality of augmentation content may be further based on the at least one viewer preference. Accordingly, viewer preferences may be taken into account by the platform while retrieving relevant augmentation content to be presented to the broadcaster.

In some embodiments, presenting of the augmented media content on the viewer device may be based further on at least one viewer preference. Accordingly, the augmented content may be further filtered at the viewer device end based on one or more viewer preferences.

In some embodiments, the method 700 may further include receiving, using the communication unit, at least one time indicator from the broadcaster device. Further, the at least one time indicator may be associated with play time of the media content. Further, the embedding of the augmentation content may be based on the at least one time indicator. Further, presenting of the augmentation content associated with a time indicator may be synchronous with presenting of the media content corresponding to the time indicator. Accordingly, the broadcaster may specify what points on the time-line of the media content (e.g. video) are to be associated with augmentation content.

In some embodiments, the at least one broadcaster preference may include a conditional statement specifying a condition based on the at least one viewer context variable and an associated augmentation content. Further, the associated augmentation content may be retrieved by the viewer device based on the conditional statement. Accordingly, in addition to augmentation content embedded by the online platform, further augmentation content may be presented to the viewer based on rules specified by the broadcaster. Accordingly, for example, during playtime of a video, augmentation content according to such rules may be retrieved and presented.

In some embodiments, the method 700 may further include receiving, using the communication unit, at least one auto-response content from the broadcaster device. Further, the at least one auto-response content may be associated with the augmentation content. Additionally, the method 700 may include embedding, using the processing unit, the at least one auto-response content in the media content. Further, the at least one auto-response content may be transmitted to at least one communication device associated with the viewer device based on an interaction of a viewer with the viewer device in association with the augmentation content. Accordingly, an SMS/email may be transmitted to the viewer based on an interaction of the viewer with an augmentation content and/or the augmented content. Further, the content of the response may be predetermined by the broadcaster and relevant custom data (e.g. name, contact number etc.) may be included based on characteristics of the viewer device.

Figure 8:
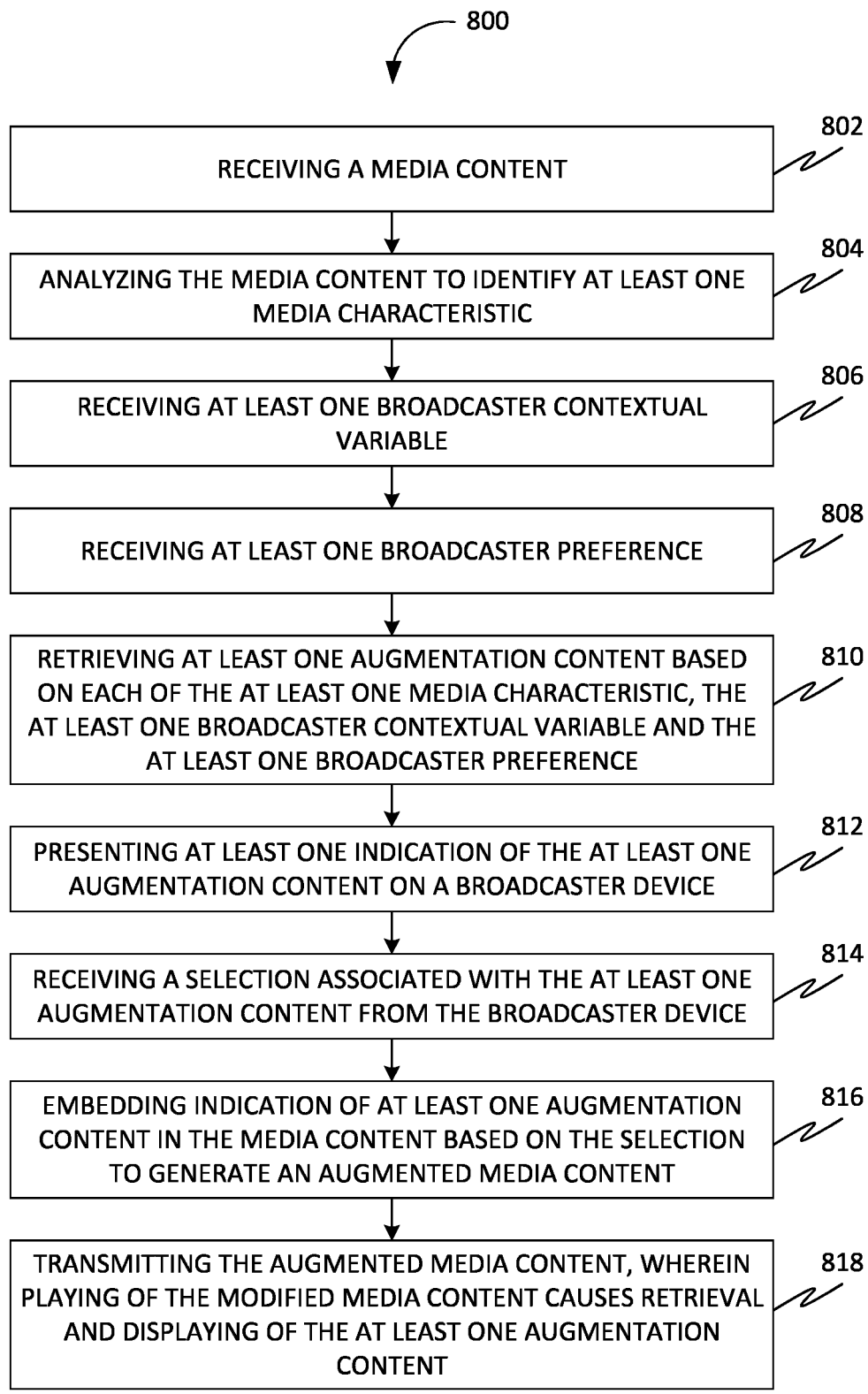
FIG. 8 illustrates a flowchart of a method of generating augmented media content based on analysis of media content, in accordance with some embodiments.

FIG. 8 illustrates a method 800 of providing augmented media content, in accordance with some embodiments. The method 800 may include a stage 802 of receiving a media content from a broadcaster device. Further, the method 800 may include a stage 804 of analyzing the media content to identify at least one media characteristic. Further, the method 800 may include a stage 806 of receiving at least one broadcaster contextual variable. Further, the method 800 may include a stage 808 of receiving at least one broadcaster preference. Further, the method 800 may include a stage 810 of retrieving at least one augmentation content based on each of the at least one media characteristic, the at least one broadcaster contextual variable and the at least one broadcaster preference. Further, the method 800 may include a stage 812 of presenting at least one indication of the at least one augmentation content on a broadcaster device. Further, the method 800 may include a stage 814 of receiving a selection associated with the at least one augmentation content from the broadcaster device. Further, the method 800 may include a stage 816 of embedding indication of at least one augmentation content in the media content based on the selection to generate an augmented media content. Further, the method 800 may include a stage 818 of transmitting the augmented media content, wherein playing of the modified media content causes retrieval and displaying of the at least one augmentation content.

In accordance with some embodiments, a second method of providing augmented media content may be provided. The second method may include receiving, using the processing unit, at least one broadcaster preference. Further, the second method may include receiving, using a processing unit, a media content from a media source. Further, the second method may include analyzing, using the processing unit, the media content. Further, the second method may include identifying, using the processing unit, at least one interaction element in the media content based on the analyzing. Further, the second method may include identifying, using the processing unit, at least one augmentation content based on each of the at least one interaction element and the at least one broadcaster preference. Further, the second method may include embedding, using the processing unit, the at least one augmentation content in the media content to obtain an augmented media content. Further, the second method may include transmitting, using a communication unit, the augmented media content to a viewer device. Further, the viewer device may be configured to present the media content. Further, the viewer device may be associated with at least one viewer preference and at least one viewer contextual data. Further, presenting of the at least one augmentation content may be based on the at least one viewer preference and the at least one viewer contextual data.

In accordance with some embodiments, a third method of providing augmented media content is provided. The third method may include receiving, using a communication unit, a media content from a broadcaster device. Further, the third method may include receiving, using the communication unit, at least one broadcaster contextual data from the broadcaster device. Further, the at least one broadcaster contextual data may be associated with one or more of the media content and a broadcaster associated with the user device. Further, the third method may include analyzing, using a processing unit, one or more of the media content and the at least one broadcaster contextual data. Further, the third method may include identifying, using the processing unit, a plurality of augmentation content based on the analyzing. Further, the third method may include transmitting, using the communication unit, the plurality of augmentation content to the broadcaster device. Further, the third method may include receiving, using the communication unit, a selection of at least one augmentation content from the plurality of augmentation content. Further, the third method may include embedding, using the processing, one or more of the at least one augmentation content in the media content to obtain an augmented media content. Further, the third method may include transmitting, using the communication unit, the augmented media content to the broadcaster device.

Figure 2:
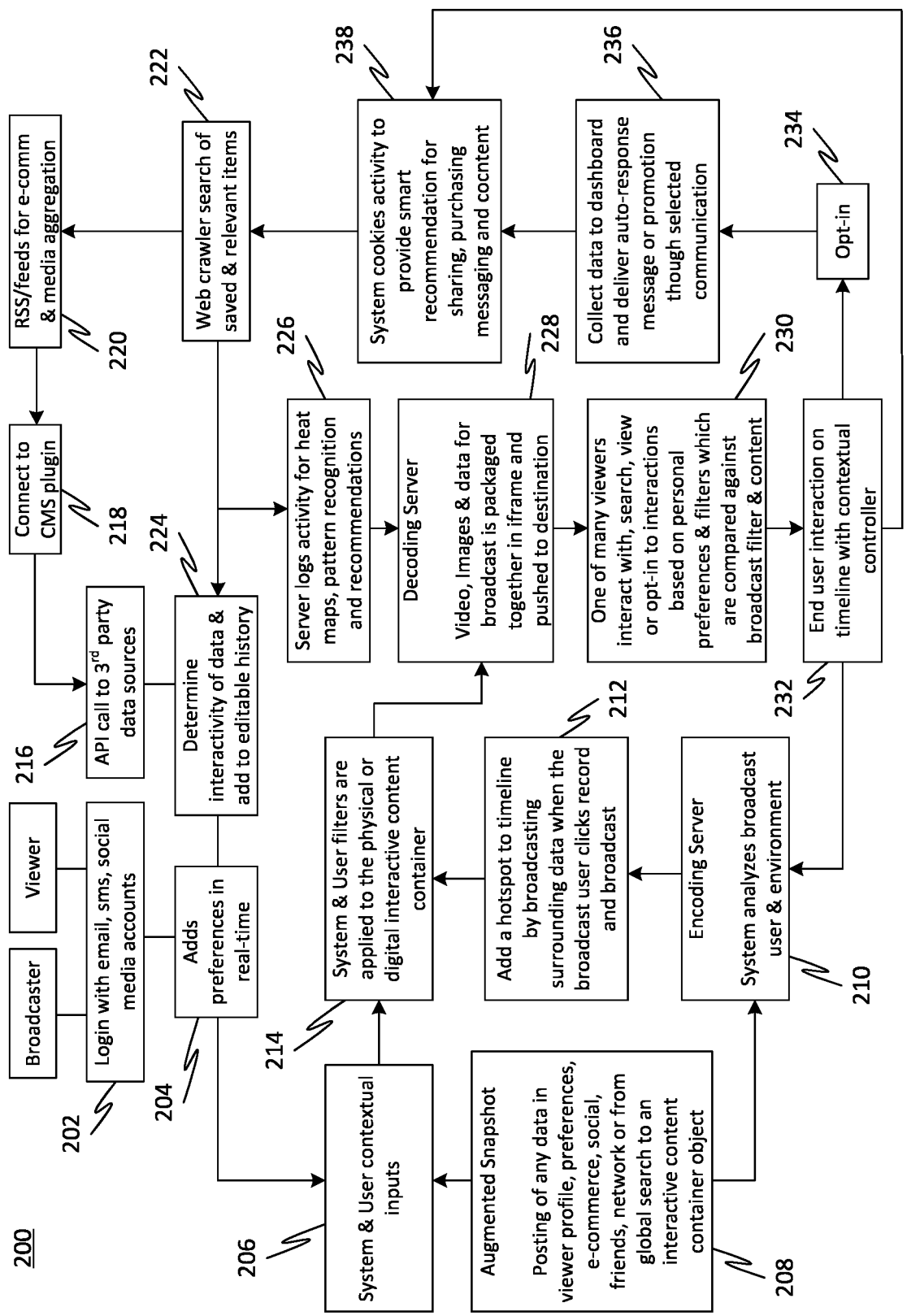
FIG. 2 illustrates a flowchart of a method of generating an augmented media content, in accordance with some embodiments.

FIG. 2 illustrates a flowchart of a method 200 of generating an augmented media content, in accordance with some embodiments. At step 202, a broadcaster and/or a viewer may login with email, SMS, social media accounts etc. At step 204, the broadcaster and/or the viewer may add preferences in real-time. At step 206, System and User contextual inputs may be received from the broadcaster and/or the viewer. In an instance, such inputs and contextual data may include environmental data, historical data, physical movements (of eyes, body etc.), facial and pattern recognition, image recognition, user preferences, IOT/WiFi/BLE/RF, social media, friends, trends data, GPS data, time, tags, advertisements, promotions, 3rd party videos etc. Further, at step 208, posting of any data in viewer profile, preferences, e-commerce, social, friends, network or from global search may be added to an interactive content container object (i.e. Augmented Snapshot). At step 210, broadcast user and environment may be analyzed. This may include for example, direction of all cameras, distance, location, elevation, position, directional movement, eye movement, mouse or gesture movement, environmental conditions, trends etc. Further, at step 212, the broadcaster may add a hotspot to timeline by broadcasting surrounding data when the broadcaster clicks record and broadcast. Further, at step 214, System and User filters may be applied to the physical or digital interactive content container. This may include, e-commerce, location/time/speed, social media, people, media content, searchable web, IOT, ad-networks etc. In order to retrieve augmentation content, a step 216 may be executed. Accordingly, API calls to 3rd party data sources may be invoked. Additionally, at step 218, connection to a CMS plugin may be established in order to obtain the augmentation content. Further, at step 220, RSS/feeds for e-commerce and media aggregation may be performed. Further, at step 222, Web crawler search of saved and relevant items may be performed. Additionally, at step 224, interactivity of data may be determined and added to editable history. Further, activity for heat maps, pattern recognition and recommendations may be logged. Further, at step 228, Video, Images and data for broadcast may be packaged together in an iframe and pushed to destination (i.e. a viewer device). Alternatively, the augmented content may be directly shared or sent to viewer via web, Bluetooth, SMS or other data transfer method. Further, in another instance, the augmented content may be broadcasted to one or more many embedded iframes on multiple destinations. Further, the viewing filters may be created based on the System and User contextual inputs available. Further, at step 230, one of many viewers may interact with, search, view or opt-in to interactions based on personal preferences and filters which are compared against broadcaster filter and content. Further, at step 232, end user interaction on timeline with contextual controller may be performed. This may include media, text, social media, email etc. Further, at step 234, viewers may opt-in for providing interaction data and/or receiving promotions, deals etc. Accordingly, at step 236, interaction data may be collected and presented on the dashboard and auto-response message or promotion may be delivered to viewers though selected communication (e.g. SMS, email, IM, social media etc.). Further, at step 238, cookies may track activity to provide smart recommendation for sharing, purchasing messaging and content.

Figure 3:
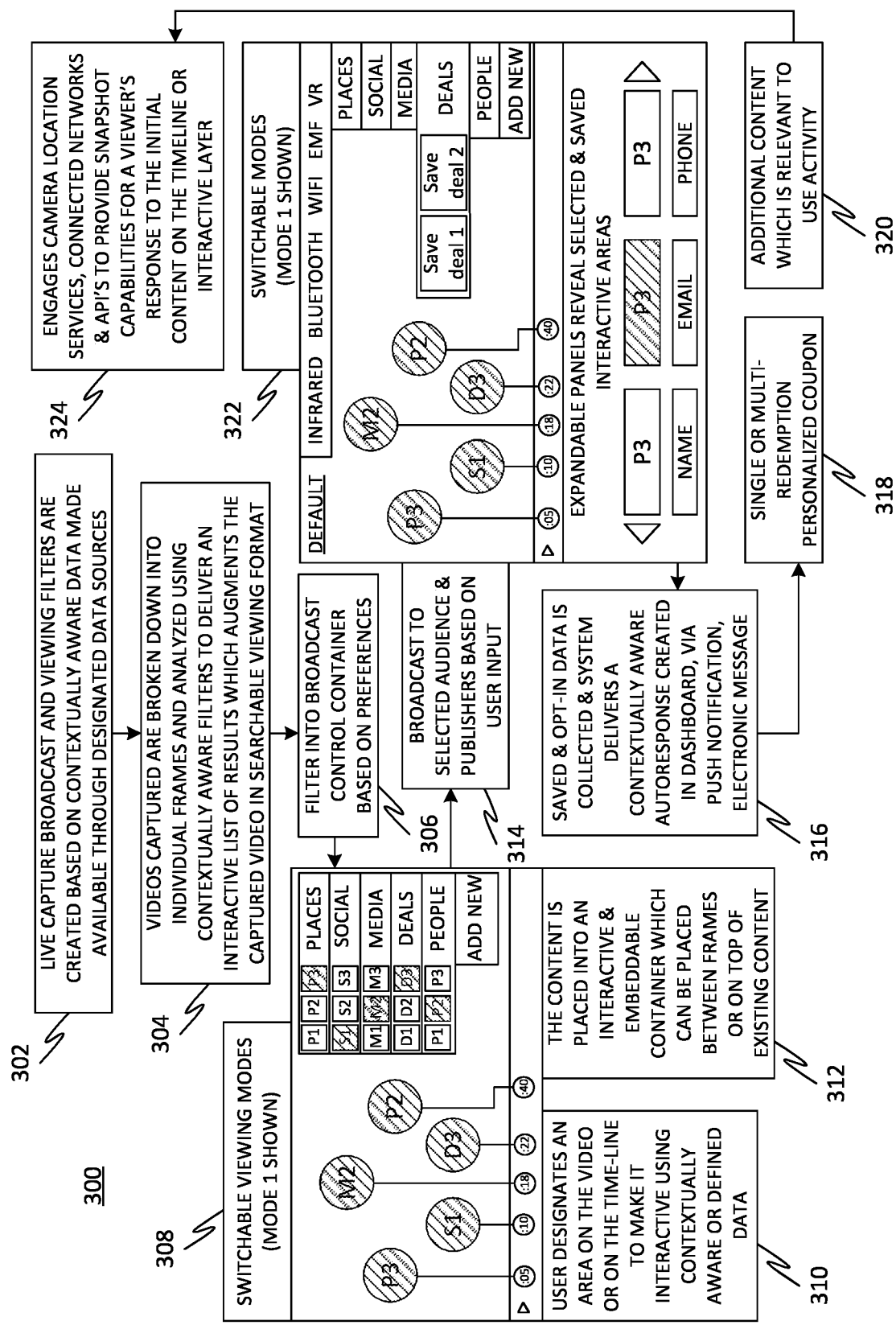
FIG. 3 illustrates a flowchart of a method of generating an augmented media content including a depiction of user interfaces presented on a broadcaster device and a viewer device, in accordance with some embodiments.

FIG. 3 illustrates a flowchart of a method 300 of generating an augmented media content including a depiction of user interfaces presented on a broadcaster device and a viewer device, in accordance with some embodiments. At step 302, live capture, broadcast and viewing filters are created based on contextually aware data made available through designated data sources. At step 304, videos captured are broken down into individual frames and analyzed using contextually aware filters to deliver an interactive list of results which augments the captured video in a searchable viewing format. At step 306, filtering into broadcast control container based on preferences may be performed. At step 308, a switchable viewing mode may be selected. Further, at step 310, the user (e.g. a broadcaster) designates an area on the video or on the time-line to make it interactive using contextually aware or defined data. For example, as illustrated, the broadcaster may identify one or more time points on the time-line of the video where augmented content is to be include. Further, for each time-point selected by the broadcaster, multiple augmented content may be presented for selection. For example, as shown, a plurality of categories of augmented content may presented, such as, but not limited to, places (P1, P2, P3), social (S1, S2, S3), media (M1, M2, M3), deals (D1, D2, D3), people (P1, P2, P3). Accordingly, the broadcaster may select one or more instances of one or more categories. For example, as shown, the broadcaster's selection of P3, S1, M2, D3, P2 corresponding to respective plurality of categories may be performed. Further, in some instances, the broadcaster may be enabled to include a new category.

Accordingly, at step 312, the content is placed into an interactive and embeddable container which can be placed between frames or on top of existing content. Further, at step 314, the content with the interactive and embeddable container may be broadcast to selected audience and publishers based on user input. At step 316, saved and opt-in data may be collected and system may deliver a contextually aware auto-response created in dashboard, via push notification, electronic messaging (e.g. SMS, email, Chat, social media, etc.). Further, at step 318 single or multi-redemption personalized coupon may be delivered. Further, at step 320, additional content which is relevant to user activity may also be delivered. Accordingly, at step 322, a viewer may select one or a plurality of switchable viewing modes and accordingly view the delivered content. Further, at step 324, engagement with camera, location, services, connected networks and API's may be performed to provide snapshot capabilities for a viewer's response to the initial content on the timeline or interactive layer.

Figure 4:
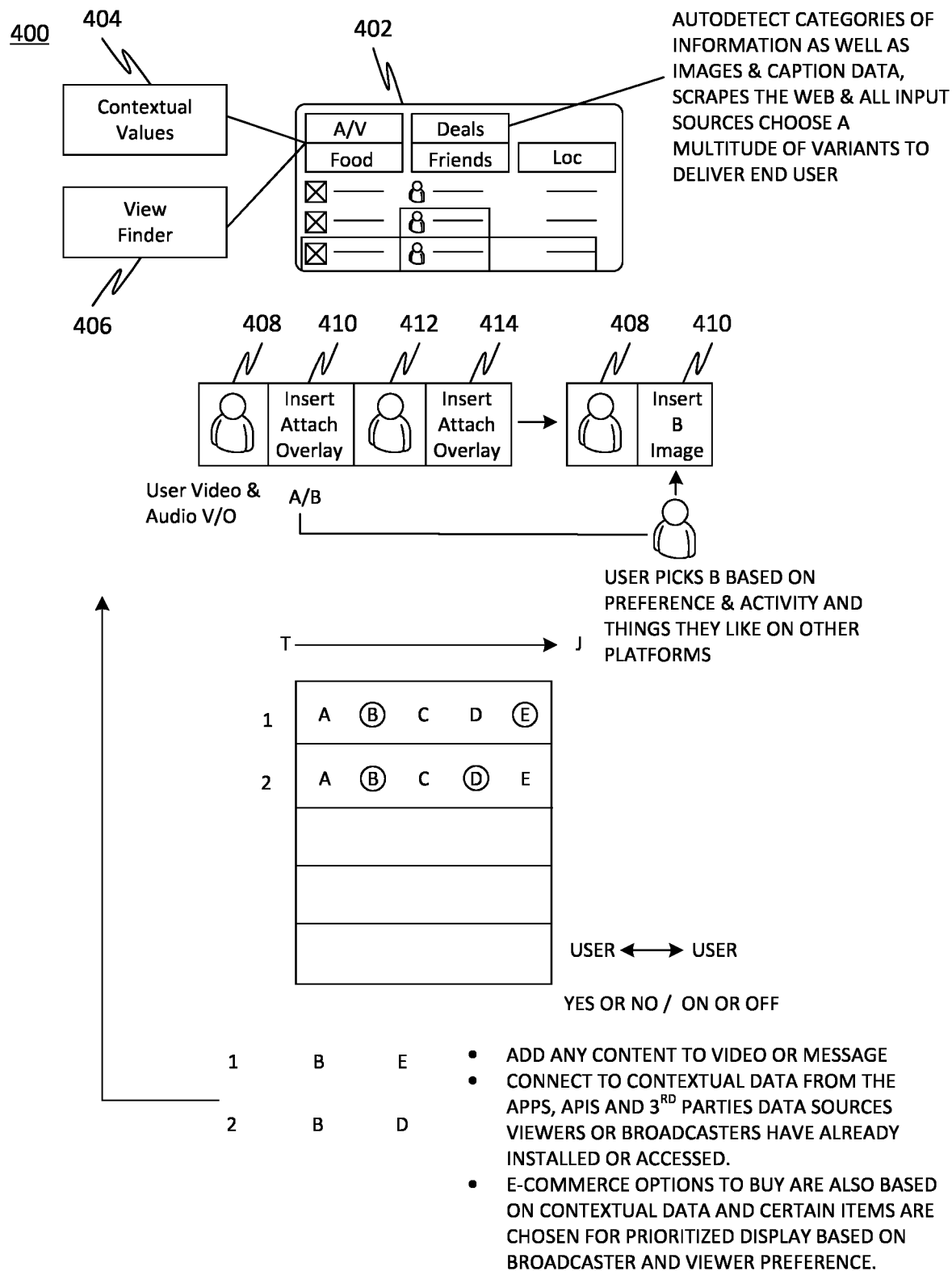
FIG. 4 illustrates embedding of augmentation content in a media content for generating an augmented media content, in accordance with some embodiments.

FIG. 4 illustrates embedding of augmentation content in a media content for generating an augmented media content, in accordance with some embodiments. As shown, the media content may be analyzed and a plurality of categories of augmentation content may be identified based on the analysis and presented to the broadcaster in user interface 402 on the broadcaster device. Further, the augmentation content may be identified based on contextual values 404 that may be determined using, for example, sensors associated with the broadcaster device and/or the viewer device. Additionally, the augmentation content may be identified based on view finder status. Accordingly, the augmentation content may be relevant only to a portion of media content associated with the view finder status. The view finder status may correspond to one or more of the broadcaster device and the viewer device. Further illustrated is the embedding of the augmentation content into the media content. In an instance, the augmentation content may be embedded in between the frames of media content. For example, augmentation content may be embedded in slots 410 and 414 interspersing media content frames 408 and 414. In an instance, the augmentation content embedded in slot 410 may include images corresponding to users A and B. Accordingly, when the user B receives the augmented media content, the image B is retrieved and presented to the user B based on preferences and/or activity of user B.

Likewise, a plurality of augmentation content corresponding to multiple users A, B, C, D and E may be embedded in the media content. Accordingly, when the augmented media content is presented on a viewer device, a respective augmentation content may be retrieved and presented to the user of the viewer device. Further, each user may specify multiple modes, wherein each mode may correspond to a filtering of the augmentation content.

Accordingly, the platform may allow adding any content to a video or message. Subsequently, the platform facilitates connecting to contextual data from apps, APIs and 3rd party data sources already installed or accessed by viewers or broadcasters. Further, the platform also enables E-Commerce options to buy based on contextual data and certain items are chosen for prioritized display based on broadcaster and viewer preferences.

Further, in some embodiments, the viewer can respond with their own augmented content back to the broadcaster or share via 2-way multimedia messaging and interaction. Accordingly, the platform in some embodiments may function as a social media platform while enabling users to augment contextually aware content in media items, such as, but not limited to, videos.

Figure 5:
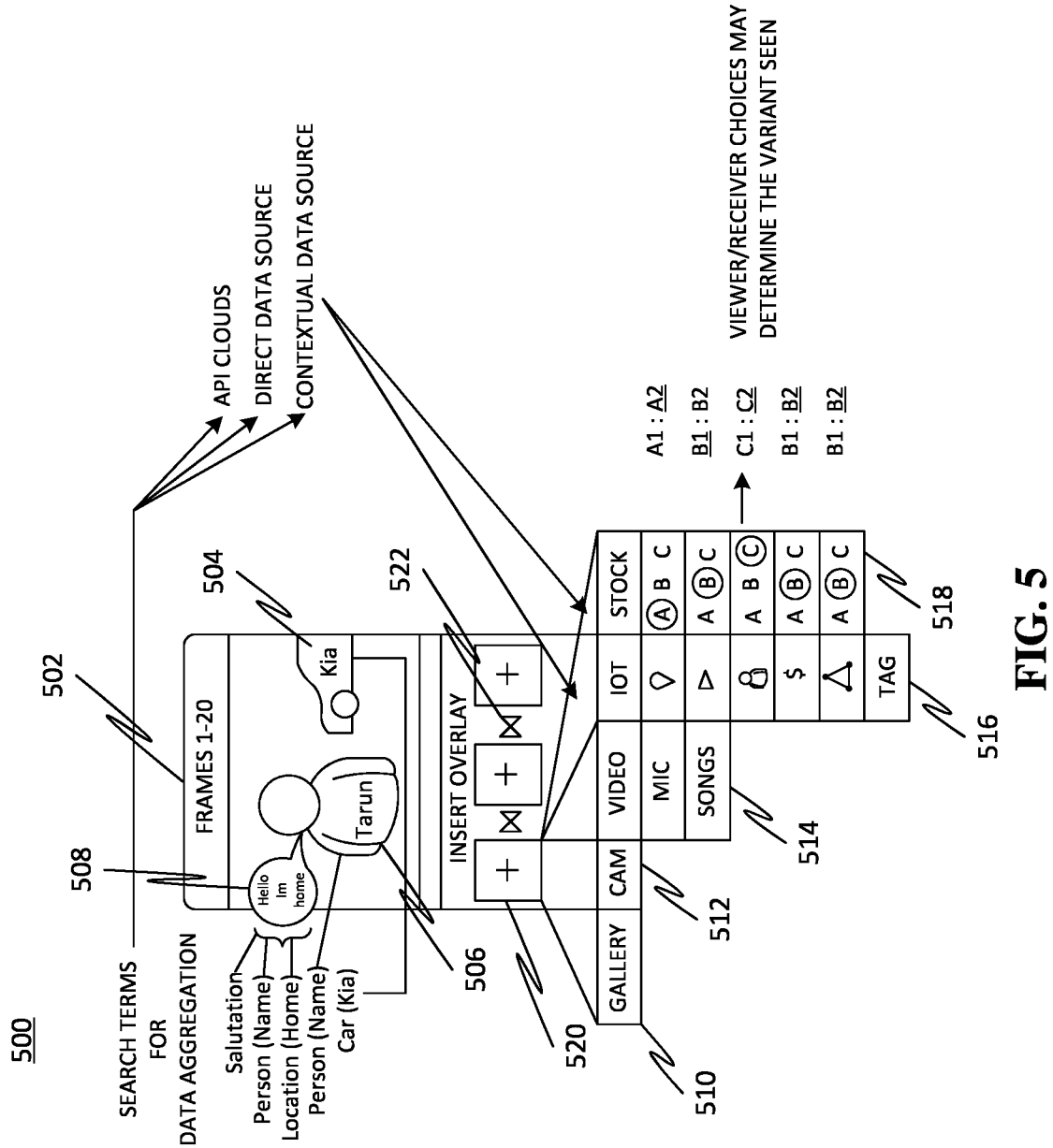
FIG. 5 illustrates an exemplary user interface presentable on a broadcaster device for facilitating augmentation of media content, in accordance with some embodiments.

FIG. 5 illustrates an exemplary user interface 500 presentable on a broadcaster device for facilitating augmentation of media content, in accordance with some embodiments. In an instance, the media content may be analyzed to detect interaction points (e.g. people, places, speech, products, brands, etc.). As illustrated, analysis of frames 1-20 of media content 502 may indicate presence of product 504 (e.g. car KIA), person 506 and message 508 (e.g. greeting). Such analysis may accordingly include, speech recognition, face detection, object detection and so on. Accordingly, based on the detected interaction points, a plurality of augmentation content may be identified and presented to the broadcaster. Further, the analysis of the media content and/or retrieval of augmentation content may be performed by accessing API clouds, direct data sources and contextual data sources. Further, in some embodiments, the detected interaction points may be presented to the broadcaster and a feedback (e.g. confirmation or corrections) may be received. As a result, accuracy of interaction points detection may be improved. Additionally, the interaction points detected may be used for searching the media content and/or the augmented media content based on search terms identified as a result of detecting the interaction points.

In an instance, the user interface may include an "Insert Overlay" GUI element showing two options (insert or overlay) which can be applied to any uploaded clip or contextual content. The GUI elements 520 (boxes with the plus signs) allow the broadcaster to add media content and/or augmentation content, while GUI elements 522 (triangle shaped) in between are for transition options between content.

Further, the plurality of augmentation content may be provided in the form of predetermined categories 516 (e.g. IOT, location, media, person, e-commerce/deals, social/sharing, tags, etc. Further, the augmentation content may include stock images 518 that may be selected and presented to viewers based on contextual data and/or viewer preferences. In an instance, the stock images 518 may be present on a local storage associated with the broadcaster device and/or the viewer device.

Further, the user interface may enable a user, such as the broadcaster, to select the media content from one or more sources (e.g. gallery 510, camera 512, media source 514 that may include video, microphone and songs). Further, the broadcaster can add content via Mic or Camera input (viewfinder, photo/video/audio) or uploaded content source (e.g. Youtube™ or library). Accordingly, all uploaded or real-time (frame based or still image recognition in viewfinder) content can be scanned by image/facial recognition and parsed against databases of content or used as queries to contextual data sources.

Additionally, the user interface may enable a viewer to choose yes/no or toggle contextual suggestions/survey and variants from the broadcaster which conditionally prompt an action.

Figure 6:
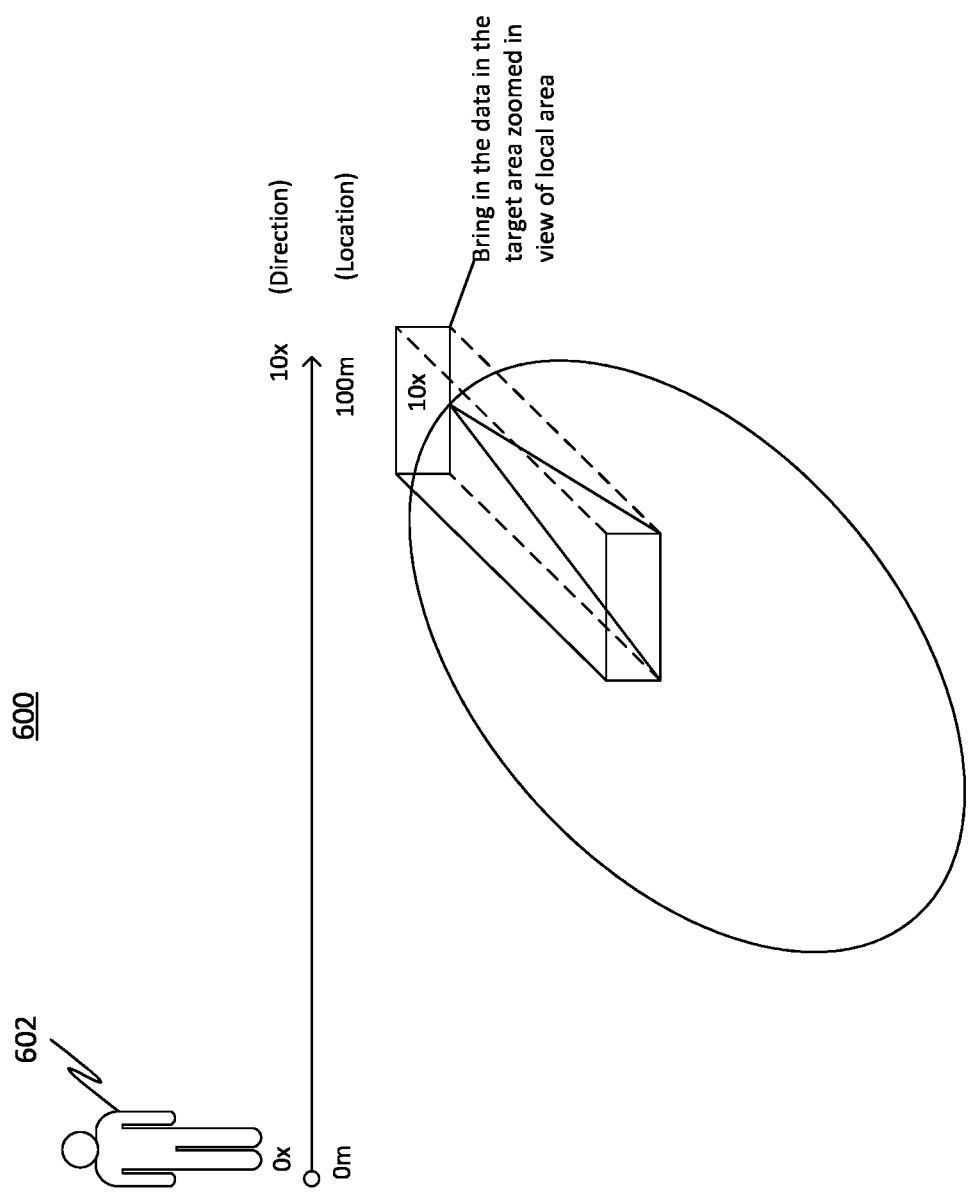
FIG. 6 illustrates augmentation of media content based on viewing region (as characterized by zoom factor, distance, etc.) in accordance with some embodiments.

FIG. 6 illustrates augmentation of media content based on viewing region (as characterized by zoom factor, distance etc.) in accordance with some embodiments. Accordingly, a dynamic zoom of the augmented media content may be provided. For instance, if a radius of a user 602 is 10 m or 1× zoom, the user 602 may see contextual data or augmented reality within that area. If the user 602 chooses 100 m or 10× zoom, the viewfinder may display related content around that area for augmented reality and contextual broadcasting. More generally, in some embodiments, the augmentation content presented to a viewer may be based on a portion of the media content being viewed/consumed by the viewer. The portion may correspond to a particular region in space, or an interval in time or both. Accordingly, in some embodiments, the portion of the media content being currently consumed by the viewer may be determined based on view finder status, gaze tracking, and so on. As a result, in some instances, augmentation content that is relevant to a current viewing/listening context may be identified and presented.

Figure 9:
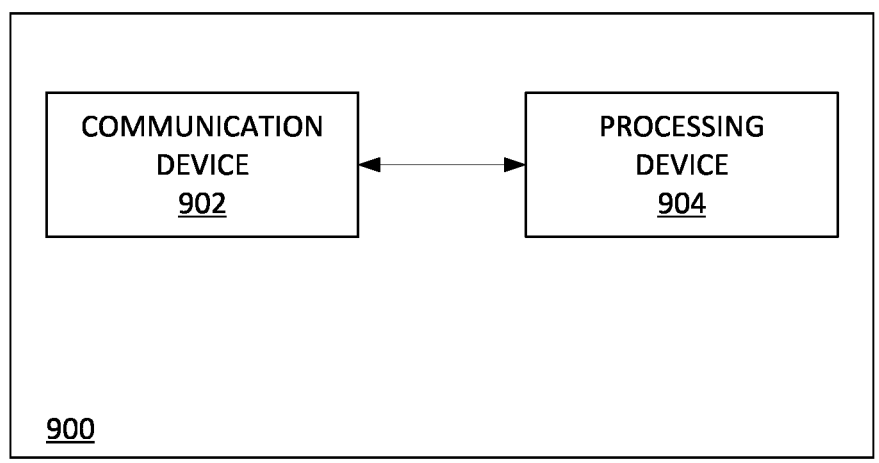
FIG. 9 is a block diagram of a system for providing content to viewers for enhancing wellbeing of the viewers, in accordance with some embodiments.

FIG. 9 is a block diagram of a system 900 for providing content to viewers for enhancing wellbeing of the viewers, in accordance with some embodiments. Accordingly, the system 900 may include a communication device 902 and a processing device 904. Further, the communication device 902 may include a communication unit. Further, the processing device 904 may include a processing unit.

Figure 10:
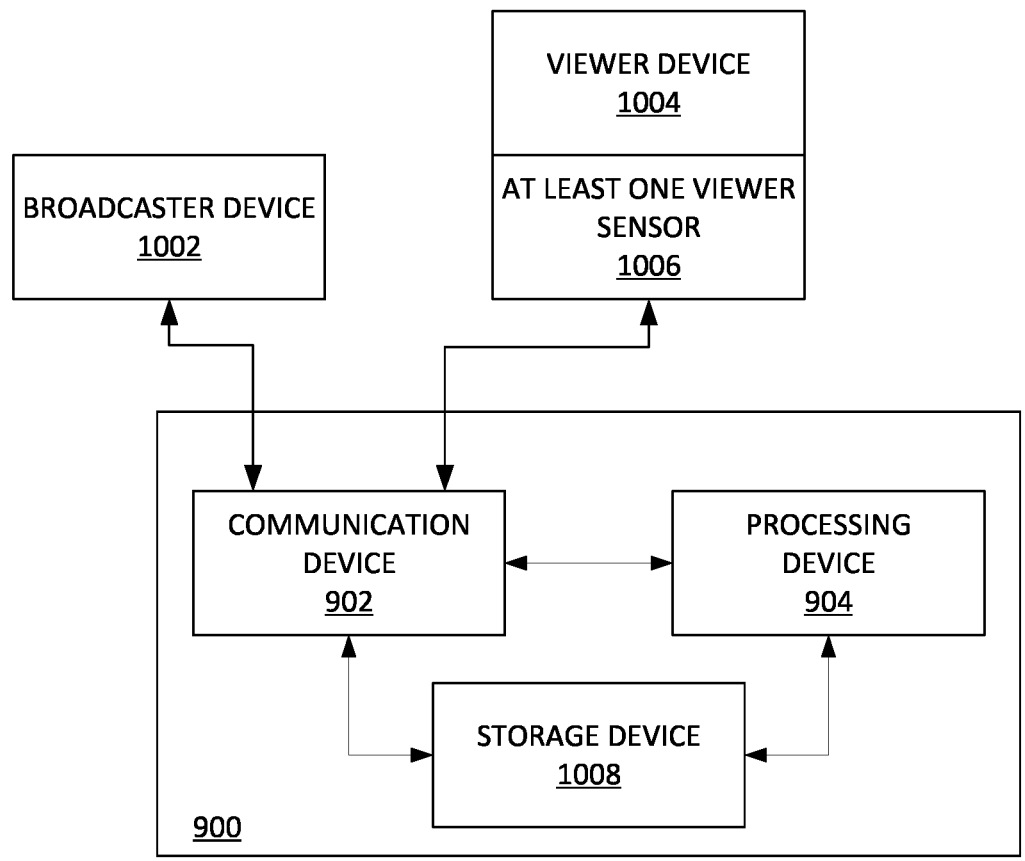
FIG. 10 is a block diagram of the system for providing the content to the viewers for enhancing wellbeing of the viewers, in accordance with some embodiments.

Further, the communication device 902 may be configured for receiving a media content from a broadcaster device 1002, as shown in FIG. 10. Further, the broadcaster device 1002 may be associated with a broadcaster. Further, the broadcaster may be an artificial intelligence (AI) entity. Further, the media content may include a plurality of content from the broadcaster device 1002. Further, the plurality of content may include a plurality of signals from a plurality of input devices comprised in the broadcaster device 1002. Further, the plurality of signals may include a plurality of analog input signals and a plurality of digital input signals. Further, the plurality of analog input signals and the plurality of digital input signals may include light signals, sound signals, vibration signals, haptic signals, biometric signals, scalar signals, radio signals, TV signals, Zigbee signals, WiFi signals, LiFi signals, IR signals, Bluetooth signals, projections, VR (virtual reality) content, etc. Further, the plurality of devices may include a light device, a sound device, a vibration device, a haptic device, a biometric device, a scalar device, a radio, a TV, a Zigbee device, a WiFi device, a LiFi device, a BLE device, an IR device, a projector, a VR device, a pro audio device, a mobile device, a desktop device, etc. Further, the broadcaster device 1002 may include a computing device, a client device, etc. Further, in an instance, the plurality of signals from the plurality of input devices may be used to generate a geometry or render an object in a virtual reality environment (such as Metaverse™). Further, the geometry and the object may be used as a NFT (Non-Fungible Token). Further, the communication device 902 may be configured for receiving at least one broadcaster preference from the broadcaster device 1002. Further, the at least one broadcaster preference may include at least one viewer context variable. Further, the at least one viewer context variable may correspond to user data, trends, historical preferences, and existing databases associated with the viewers. Further, the communication device 902 may be configured for transmitting an augmented media content to a viewer device 1004, as shown in FIG. 10. Further, the augmented media content may include an audio content, a video content, an audio-video content, a haptic content, a virtual reality (VR) content, an augmented reality (AR) content, etc. Further, the viewer device 1004 may include a computing device, a client device, an output device, an input device, etc. Further, the viewer device 1004 may be configured for presenting the augmented media content to a viewer. Further, the viewer device 1004 may include a receiver device associated with a receiver. Further, the viewer may include the receiver. Further, the viewer may include a user, an individual, etc. Further, the presenting of the augmented media content on the viewer device 1004 may be based on at least one viewer context value corresponding to the at least one viewer context variable. Further, the viewer device 1004 may include a plurality of analog devices and a plurality of digital output devices. Further, the plurality of analog devices and the plurality of digital output devices may include a light device, a sound device, a vibration device, a haptic device, a biofeedback device, a scalar device, a radio, a TV, a binaural device, a multi-phase device, a Zigbee device, a WiFi device, a LiFi device, a BLE device, an IR device, a projection device, an IOT device, a Virtual Assistant device, a VR device, a mobile device, and a desktop device in home or in air/road travel environments. Further, the at least one viewer context variable corresponds to at least one viewer sensor 1006 (one or more sensors), as shown in FIG. 10, comprised in the viewer device 1004. Further, the at least one viewer sensor 1006 may be a human implantable device, an implantable sensor, etc. Further, the at least one viewer sensor 1006 may include a camera, a microphone, a gesture sensor, a motion sensor, a biological sensor, a physiological sensor, a physical sensor, a biokinetic sensor, etc. Further, the at least one viewer sensor 1006 may be configured for generating the at least one viewer context value for the at least one viewer context variable based on detecting a response of the viewer corresponding to the augmented media content. Further, in an instance, the detecting of the response of the viewer may include detecting the response of the viewer in real time. Further, the response may include a voluntary response, an involuntary response, etc. of the viewer. Further, the communication device 902 may be configured for transmitting the augmented media content to the broadcaster device 1002. Further, the at least one viewer context variable may include a classification of the response. Further, the at least one viewer context value may include a level of the response provided by the viewer for the classification of the response.

Further, the processing device 904 may be communicatively coupled with the communication device 902. Further, the processing device 904 may be configured for generating the augmented media content for the enhancing of the wellbeing of the viewer based on the at least one viewer context variable and the media content. Further, the augmented media content may include a layered content. Further, the layered content may include layers of audio, visual, haptic, XR, consumable content, etc. Further, the generating of the augmented media content may include at least one of an individual and a combinational placing or augmenting of the layers of the audio, the visual, the haptic, the XR, the consumable content, etc. onto a base layer of a determined size, a layout, a format, a color, a frequency, a vibration, a music key, a tone, a beat per minute, a displacement, an orientation, a phase, an amplitude, a pulse width, a modulation, a prilling, a cymatic, a sequence, a geometry, a network connection, and any relevant output. Further, the generating of the augmented media content may include generating the augmented media content using at least one machine learning model. Further, the at least one machine learning model may include at least one generative algorithm. Further, the augmented media content comprises the media content and the at least one viewer context variable. Further, the enhancing of the wellbeing of the viewer may include providing entertainment, therapy, treatment, etc. to the viewer.

Further, in some embodiments, the detecting of the response may include detecting a change in at least one of a physical state, a psychological state, and a biological state of the viewer. Further, the physical state corresponds to a body temperature of the viewer. Further, the physiological state corresponds to a heart rate, a respiration rate, a pulse rate, a blood pressure, etc. of the viewer. Further, the biological state corresponds to a level of one or more hormones, cellular or genetic composition in a body of the viewer. Further, the generating of the at least one viewer context value for the at least one viewer context variable may be based on the detecting of the change in at least one of the physical state, the psychological state, and the biological state of the viewer over a fixed or adaptive period of time and as it relates to historical, comparative and relational data in context.

Further, in some embodiments, the detecting of the response may include detecting an expression of the viewer corresponding to the augmented media content. Further, the expression may include a verbal expression, a facial expression, a gesture, etc. Further, the generating of the at least one viewer context value for the at least one viewer context variable may be based on the detecting of the expression of the viewer corresponding to the augmented media content.

In further embodiments, the system 900 may include a storage device 1008, as shown in FIG. 10. Further, the storage device 1008 may include a memory storage. Further, the storage device 1008 may be communicatively coupled with the communication device 902 and the processing device 904. Further, the storage device 1008 may be configured for retrieving a plurality of augmentation content from at least one database based on the at least one broadcaster preference. Further, the communication device 902 may be configured for transmitting the plurality of augmentation content to the broadcaster device. Further, the broadcaster device may be configured to present the plurality of augmentation content. Further, the communication device 902 may be configured for receiving a selection of at least one augmentation content from the broadcaster device. Further, the generating of the augmented media content may include embedding each of the at least one augmentation content and the at least one viewer context variable in the media content to obtain the augmented media content.

Further, in an embodiment, the communication device 902 may be configured for receiving the at least one viewer context value corresponding to the at least one viewer context variable from the viewer device 1004. Further, the processing device 904 may be configured for analyzing the at least one viewer context value and the at least one viewer context variable corresponding to the at least one viewer context value using at least one second machine learning model. Further, the at least one second machine learning model may be contextually aware. Further, the processing device 904 may be configured for generating a health data for the viewer based on the analyzing of the at least one viewer context value. Further, the health data may include a health profile of the viewer. Further, the storage device 1008 may be configured for storing the health data of the viewer in a distributed ledger.

Further, in some embodiments, the communication device 902 may be configured for transmitting a transactional request for acquiring the health data of the viewer to the viewer device 1004. Further, the communication device 902 may be configured for receiving a first response for the transactional request from the viewer device 1004. Further, the first response may include a confirmation of the acquisition of the health data. Further, the communication device 902 may be configured for transmitting a number of cryptocurrency tokens to the viewer device 1004. Further, the storing of the health data may be based on the transmitting of the number of cryptocurrency tokens. Further, the processing device 904 may be configured for analyzing the health data of the viewer based on the first response. Further, the processing device 904 may be configured for determining a value of the health data of the viewer based on the analyzing of the health data. Further, the processing device 904 may be configured for generating the number of cryptocurrency tokens for the health data based on the value of the health data. Further, the number of cryptocurrency tokens may be monetized. Further, the number of cryptocurrency tokens may be associated with a monetary value. Further, the number of cryptocurrency tokens may be tradable.

Further, in some embodiments, the generating of the number of cryptocurrency tokens may include minting the number of cryptocurrency tokens for the health data based on the value of the health data.

Further, in some embodiments, the storage device 1008 may be configured for retrieving a plurality of health data of a plurality of viewers. Further, the storage device 1008 may be configured for storing the plurality of augmentation content in the at least one database. Further, the processing device 904 may be configured for analyzing the plurality of health data. Further, the processing device 904 may be configured for generating the plurality of augmentation content based on the analyzing of the plurality of health data.

Further, in some embodiments, the analyzing of the plurality of health data may include analyzing the plurality of health data using at least one machine learning model. Further, the at least one machine learning model may be contextually aware. Further, the generating of the plurality of augmentation content may be based on the analyzing of the plurality of health data using the at least one machine learning model.

Further, in some embodiments, the communication device 902 may be configured for receiving at least one viewer data associated with the viewer from the viewer device 1004. Further, the at least one viewer data may include personal information, preferences, etc. Further, the processing device 904 may be configured for analyzing the at least one viewer data using at least one first machine learning model. Further, the at least one first machine learning model may be contextually aware. Further, the processing device 904 may be configured for determining at least one requirement of the viewer for the enhancing of the wellbeing of the viewer and the at least one viewer context variable corresponding to the at least one requirement based on the analyzing of the at least one viewer data. Further, the at least one requirement may include a particular genre of entertainment, a particular therapy, etc. Further, the processing device 904 may be configured for identifying a selection of at least one first augmentation content from the plurality of augmentation content based on the at least one requirement. Further, the processing device 904 may be configured for embedding each of the at least one first augmentation content and the at least one viewer context variable in the media content to further obtain the augmented media content for the enhancing of the wellbeing of the viewer.

FIG. 10 is a block diagram of the system 900 for providing the content to the viewers for enhancing wellbeing of the viewers, in accordance with some embodiments.

Figure 11:
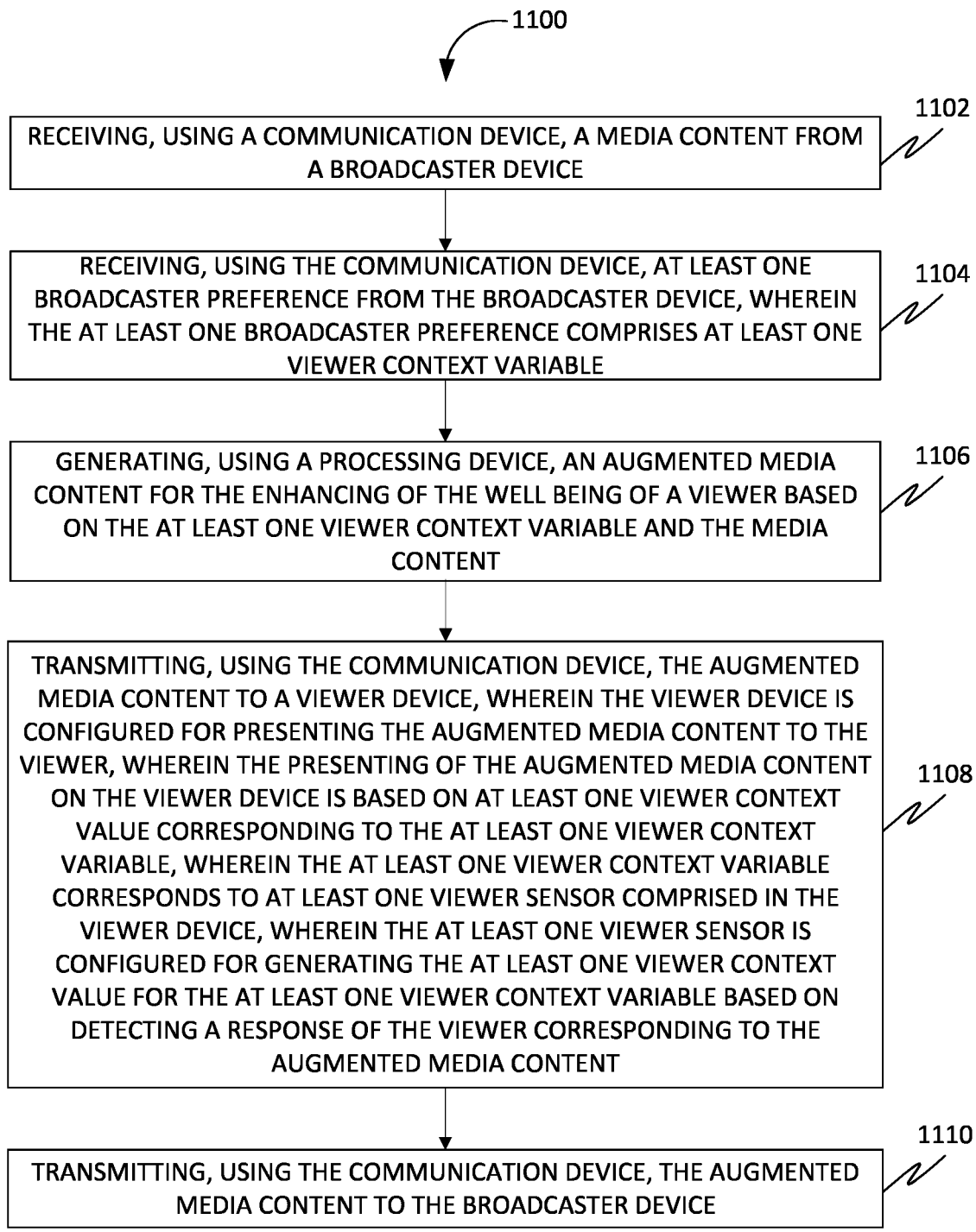
FIG. 11 is a flowchart of a method for providing content to viewers for enhancing wellbeing of the viewers, in accordance with some embodiments.

FIG. 11 is a flowchart of a method 1100 for providing content to viewers for enhancing wellbeing of the viewers, in accordance with some embodiments. Accordingly, at 1102, the method 1100 may include receiving, using a communication device, a media content from a broadcaster device.

Further, at 1104, the method 1100 may include receiving, using the communication device, at least one broadcaster preference from the broadcaster device. Further, the at least one broadcaster preference may include at least one viewer context variable.

Further, at 1106, the method 1100 may include generating, using a processing device, an augmented media content for the enhancing of the wellbeing of a viewer based on the at least one viewer context variable and the media content.

Further, the augmented media content may include the media content and the at least one viewer context variable.

Further, at 1108, the method 1100 may include transmitting, using the communication device, the augmented media content to a viewer device. Further, the viewer device may be configured for presenting the augmented media content to the viewer. Further, the presenting of the augmented media content on the viewer device may be based on at least one viewer context value corresponding to the at least one viewer context variable. Further, the at least one viewer context variable corresponds to at least one viewer sensor comprised in the viewer device. Further, the at least one viewer sensor may be configured for generating the at least one viewer context value for the at least one viewer context variable based on detecting a response of the viewer corresponding to the augmented media content.

Further, at 1110, the method 1100 may include transmitting, using the communication device, the augmented media content to the broadcaster device.

Further, in some embodiments, the detecting of the response may include detecting a change in at least one of a physical state, a psychological state, and a biological state of the viewer. Further, the generating of the at least one viewer context value for the at least one viewer context variable may be based on the detecting of the change in at least one of the physical state, the psychological state, and the biological state of the viewer.

Further, in some embodiments, the detecting of the response may include detecting an expression of the viewer corresponding to the augmented media content. Further, the generating of the at least one viewer context value for the at least one viewer context variable may be based on the detecting of the expression of the viewer corresponding to the augmented media content.

Figure 12:
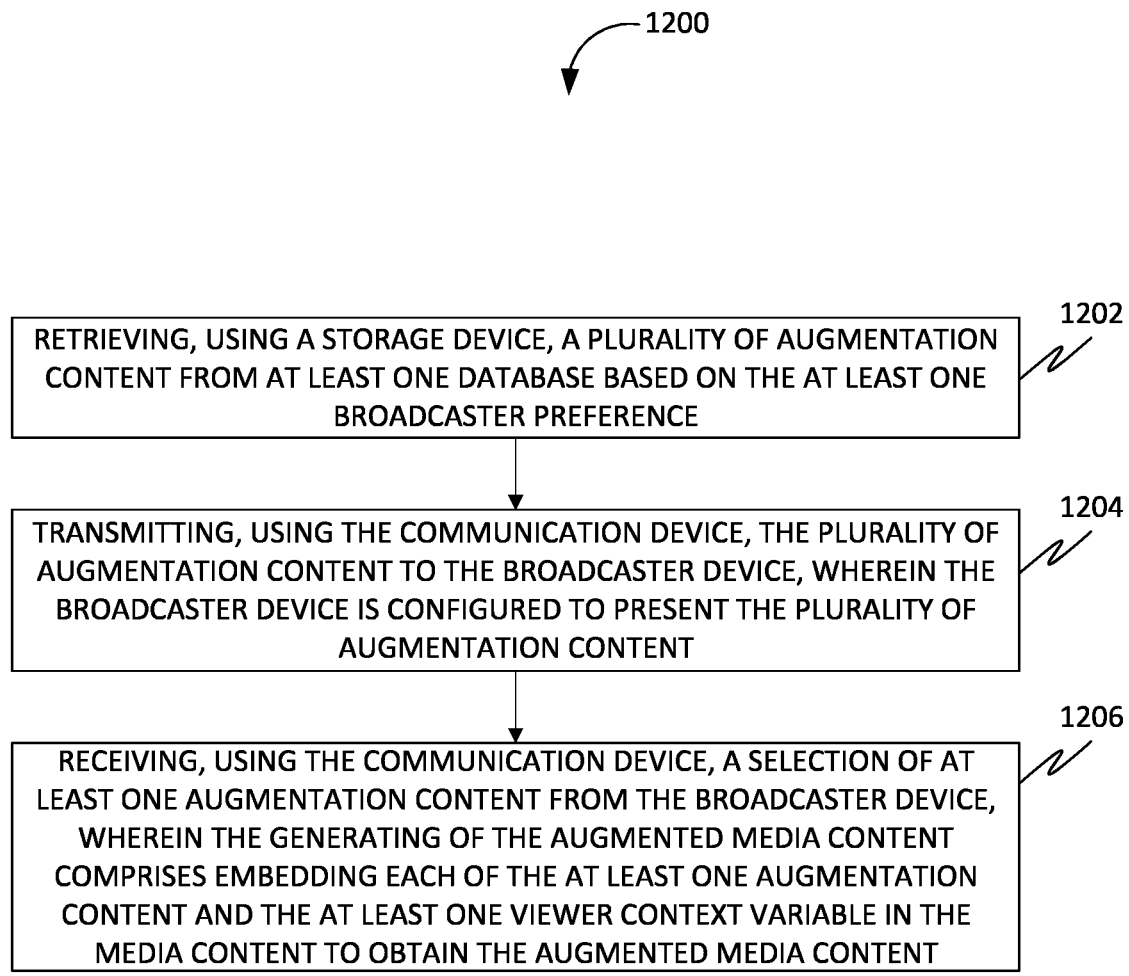
FIG. 12 is a flowchart of a method for embedding augmentation content in media content for providing the content to the viewers for enhancing the wellbeing of the viewers, in accordance with some embodiments.

FIG. 12 is a flowchart of a method 1200 for embedding augmentation content in the media content for providing the content to the viewers for enhancing the wellbeing of the viewers, in accordance with some embodiments. Further, at 1202, the method 1200 may include retrieving, using a storage device, a plurality of augmentation content from at least one database based on the at least one broadcaster preference.

Further, at 1204, the method 1200 may include transmitting, using the communication device, the plurality of augmentation content to the broadcaster device. Further, the broadcaster device may be configured to present the plurality of augmentation content.

Further, at 1206, the method 1200 may include receiving, using the communication device, a selection of at least one augmentation content from the broadcaster device. Further, the generating of the augmented media content may include embedding each of the at least one augmentation content and the at least one viewer context variable in the media content to obtain the augmented media content.

Figure 13:
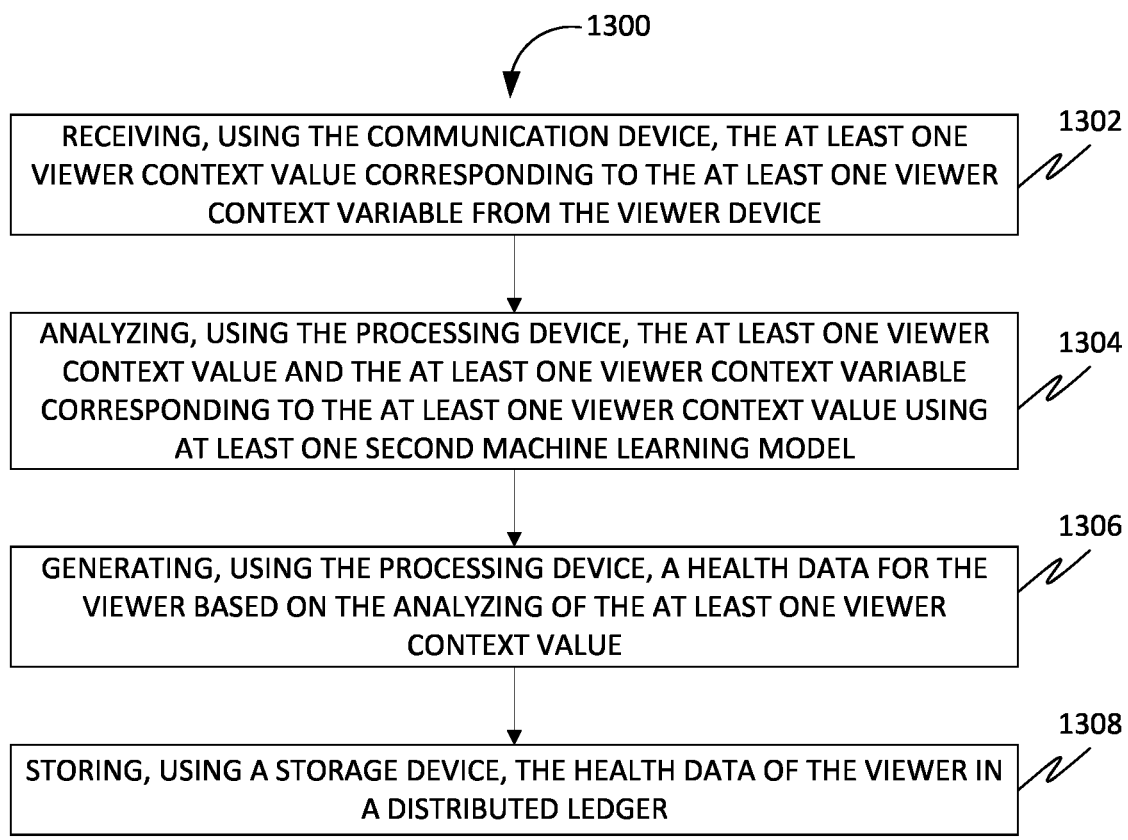
FIG. 13 is a flowchart of a method for generating health data for the viewers for providing the content to the viewers, in accordance with some embodiments.

FIG. 13 is a flowchart of a method 1300 for generating health data for the viewers for providing the content to the viewers, in accordance with some embodiments. Accordingly, at 1302, the method 1300 may include receiving, using the communication device, the at least one viewer context value corresponding to the at least one viewer context variable from the viewer device.

Further, at 1304, the method 1300 may include analyzing, using the processing device, the at least one viewer context value and the at least one viewer context variable corresponding to the at least one viewer context value using at least one second machine learning model.

Further, at 1306, the method 1300 may include generating, using the processing device, a health data for the viewer based on the analyzing of the at least one viewer context value.

Further, at 1308, the method 1300 may include storing, using the storage device, the health data of the viewer in a distributed ledger.

Figure 14:
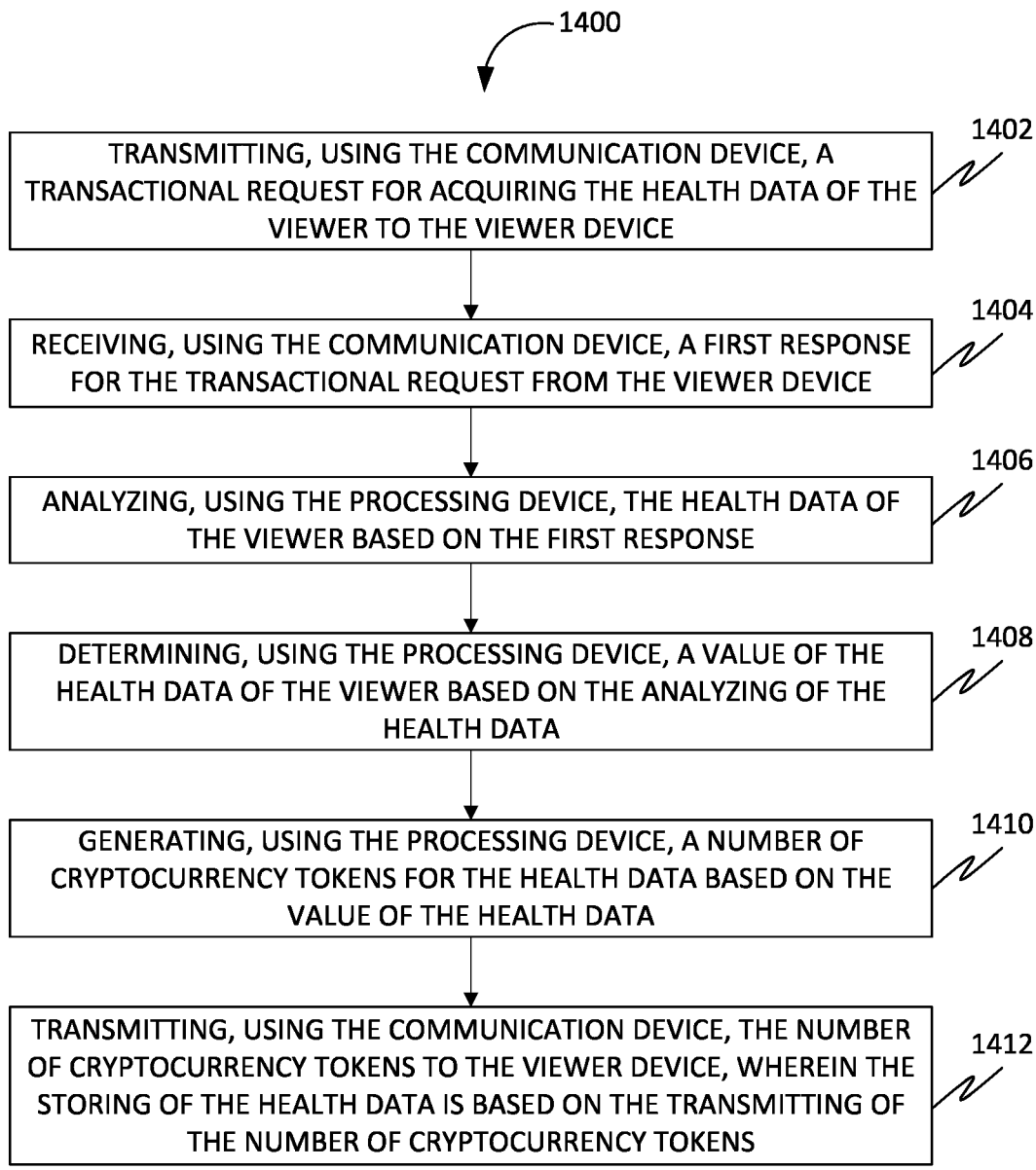
FIG. 14 is a flowchart of a method for acquiring the health data from the viewers for providing the content to the viewers, in accordance with some embodiments.

FIG. 14 is a flowchart of a method 1400 for acquiring the health data from the viewers for providing the content to the viewers, in accordance with some embodiments. Accordingly, at 1402, the method 1400 may include transmitting, using the communication device, a transactional request for acquiring the health data of the viewer to the viewer device.

Further, at 1404, the method 1400 may include receiving, using the communication device, a first response for the transactional request from the viewer device.

Further, at 1406, the method 1400 may include analyzing, using the processing device, the health data of the viewer based on the first response.

Further, at 1408, the method 1400 may include determining, using the processing device, a value of the health data of the viewer based on the analyzing of the health data.

Further, at 1410, the method 1400 may include generating, using the processing device, a number of cryptocurrency tokens for the health data based on the value of the health data.

Further, at 1412, the method 1400 may include transmitting, using the communication device, the number of cryptocurrency tokens to the viewer device. Further, the storing of the health data may be based on the transmitting of the number of cryptocurrency tokens.

Further, in some embodiments, the generating of the number of cryptocurrency tokens may include minting the number of cryptocurrency tokens for the health data based on the value of the health data.

Figure 15:
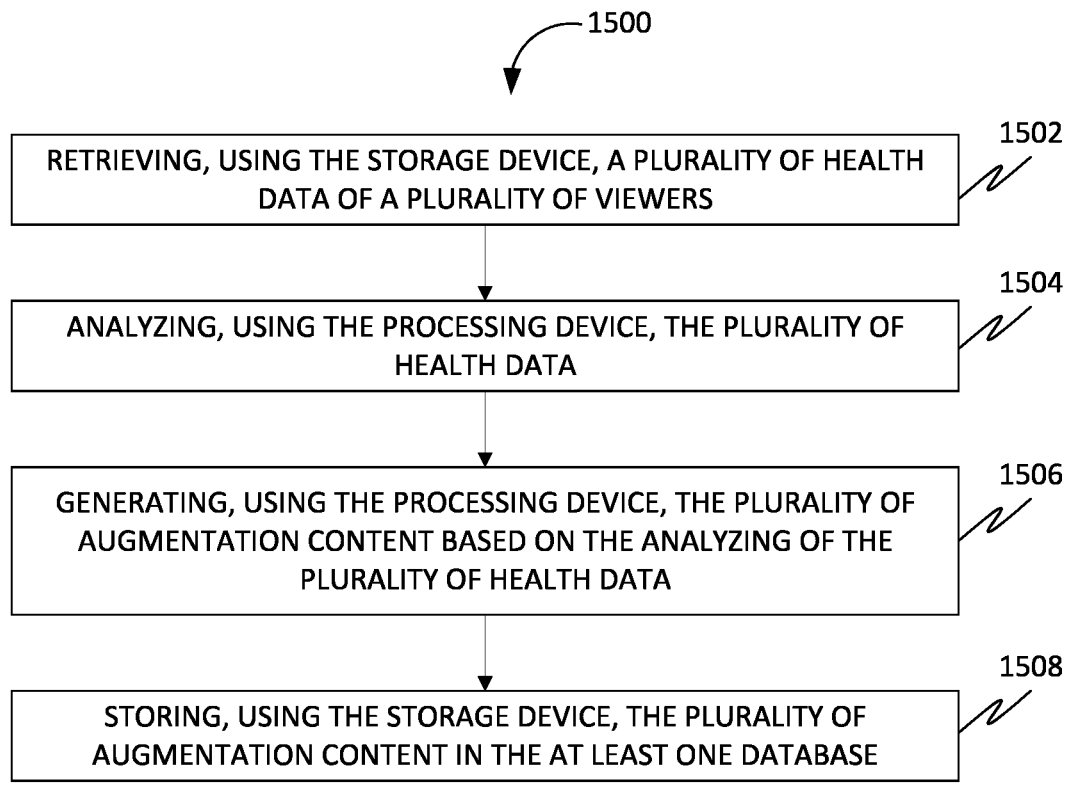
FIG. 15 is a flowchart of a method for generating augmentation content for providing the content to the viewers, in accordance with some embodiments.

FIG. 15 is a flowchart of a method 1500 for generating augmentation content for providing the content to the viewers, in accordance with some embodiments. Accordingly, at 1502, the method 1500 may include retrieving, using the storage device, a plurality of health data of a plurality of viewers.

Further, at 1504, the method 1500 may include analyzing, using the processing device, the plurality of health data.

Further, at 1506, the method 1500 may include generating, using the processing device, the plurality of augmentation content based on the analyzing of the plurality of health data.

Further, at 1508, the method 1500 may include storing, using the storage device, the plurality of augmentation content in the at least one database.

Further, in some embodiments, the analyzing of the plurality of health data may include analyzing the plurality of health data using at least one machine learning model. Further, the generating of the plurality of augmentation content may be based on the analyzing of the plurality of health data using the at least one machine learning model.

Figure 16:
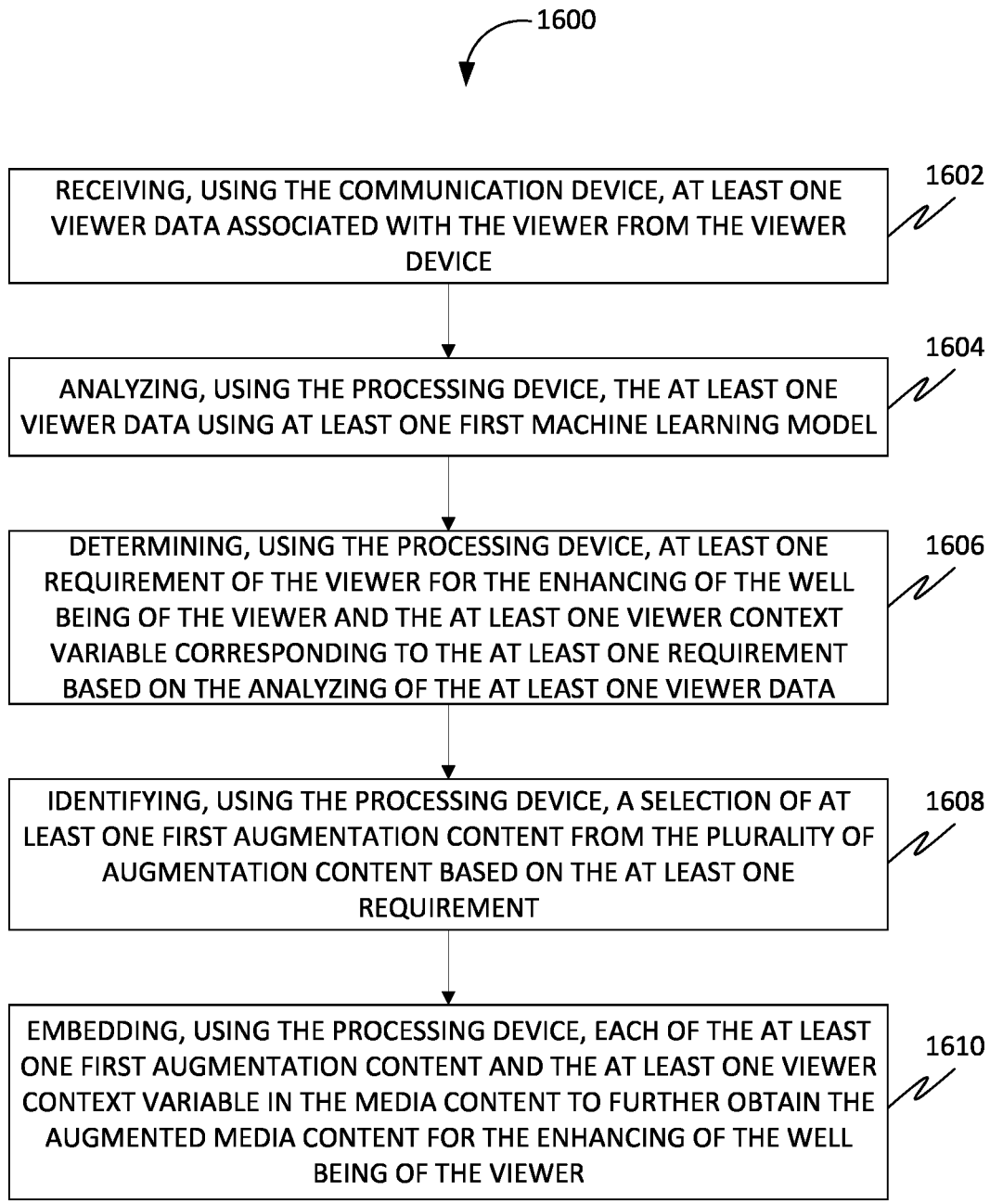
FIG. 16 is a flowchart of a method for determining requirements of the viewers for providing the content to the viewers, in accordance with some embodiments.

FIG. 16 is a flowchart of a method 1600 for determining requirements of the viewers for providing the content to the viewers, in accordance with some embodiments. Accordingly, at 1602, the method 1600 may include receiving, using the communication device, at least one viewer data associated with the viewer from the viewer device.

Further, at 1604, the method 1600 may include analyzing, using the processing device, the at least one viewer data using at least one first machine learning model analyzing, using the processing device, the at least one viewer data using at least one first machine learning model.

Further, at 1606, the method 1600 may include determining, using the processing device, at least one requirement of the viewer for the enhancing of the wellbeing of the viewer and the at least one viewer context variable corresponding to the at least one requirement based on the analyzing of the at least one viewer data.

Further, at 1608, the method 1600 may include identifying, using the processing device, a selection of at least one first augmentation content from the plurality of augmentation content based on the at least one requirement.

Further, at 1610, the method 1600 may include embedding, using the processing device, each of the at least one first augmentation content and the at least one viewer context variable in the media content to further obtain the augmented media content for the enhancing of the wellbeing of the viewer.

Figure 17:
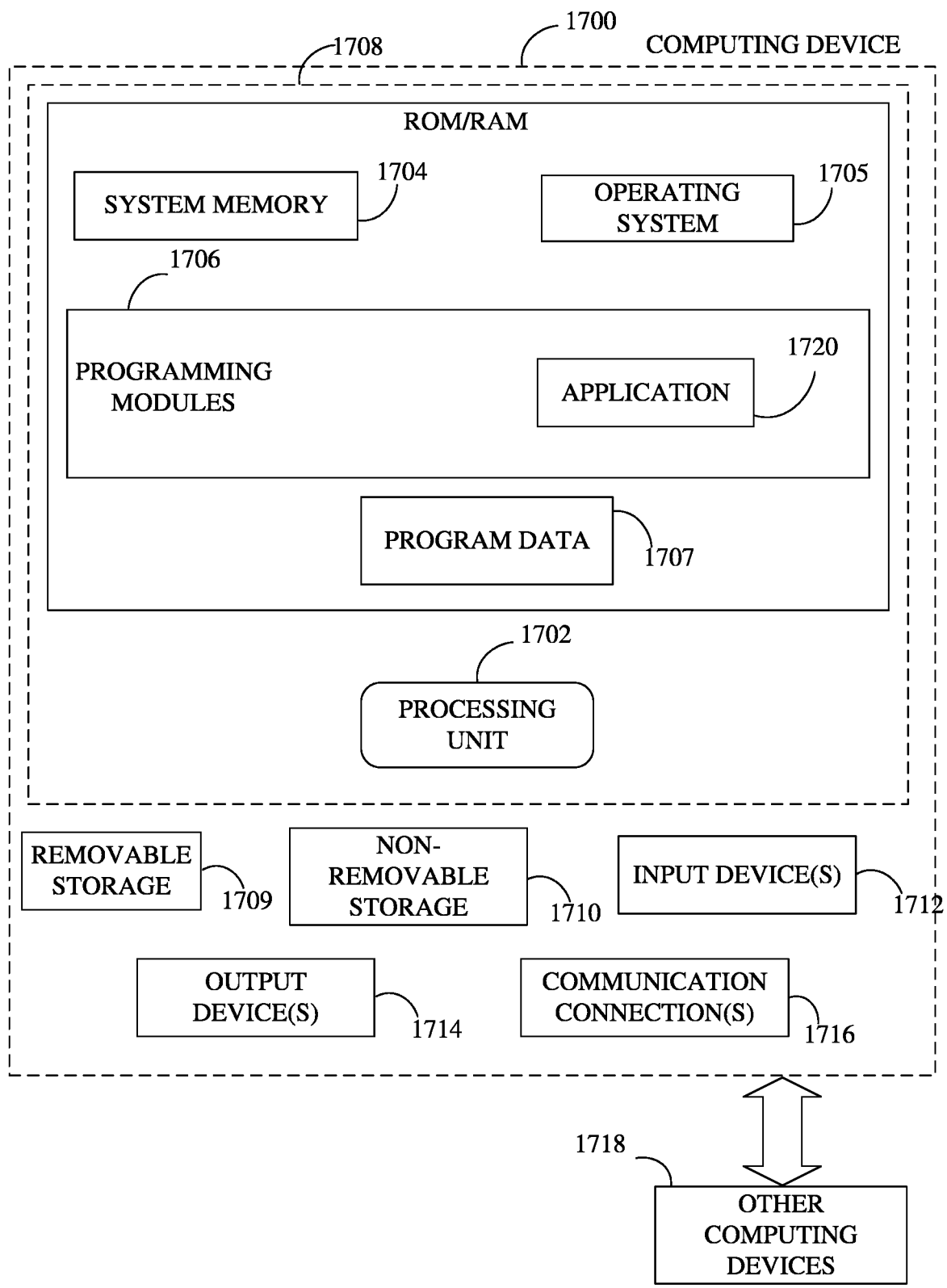
FIG. 17 is a block diagram of a computing device for implementing the methods disclosed herein, in accordance with some embodiments.

With reference to FIG. 17, a system consistent with an embodiment of the disclosure may include a computing device or cloud service, such as computing device 1700. In a basic configuration, computing device 1700 may include at least one processing unit 1702 and a system memory 1704. Depending on the configuration and type of computing device, system memory 1704 may comprise, but is not limited to, volatile (e.g. random-access memory (RAM)), non-volatile (e.g. read-only memory (ROM)), flash memory, or any combination. System memory 1704 may include operating system 1705, one or more programming modules 1706, and may include a program data 1707. Operating system 1705, for example, may be suitable for controlling computing device 1700's operation. In one embodiment, programming modules 1706 may include image-processing module, machine learning module. Furthermore, embodiments of the disclosure may be practiced in conjunction with a graphics library, other operating systems, or any other application program and is not limited to any particular application or system. This basic configuration is illustrated in FIG. 17 by those components within a dashed line 1708.

Computing device 1700 may have additional features or functionality. For example, computing device 1700 may also include additional data storage devices (removable and/or non-removable) such as, for example, magnetic disks, optical disks, or tape. Such additional storage is illustrated in FIG. 17 by a removable storage 1709 and a non-removable storage 1710. Computer storage media may include volatile and non-volatile, removable and non-removable media implemented in any method or technology for storage of information, such as computer-readable instructions, data structures, program modules, or other data. System memory 1704, removable storage 1709, and non-removable storage 1710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1700. Any such computer storage media may be part of device 1700. Computing device 1700 may also have input device(s) 1712 such as a keyboard, a mouse, a pen, a sound input device, a touch input device, a location sensor, a camera, a biometric sensor, etc. Output device(s) 1714 such as a display, speakers, a printer, etc. may also be included. The aforementioned devices are examples and others may be used.

Computing device 1700 may also contain a communication connection 1716 that may allow device 1700 to communicate with other computing devices 1718, such as over a network in a distributed computing environment, for example, an intranet or the Internet. Communication connection 1716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1704, including operating system 1705. While executing on processing unit 1702, programming modules 1706 (e.g., application 1720 such as a media player) may perform processes including, for example, one or more stages of methods, algorithms, systems, applications, servers, databases as described above. The aforementioned process is an example, and processing unit 1702 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 18:
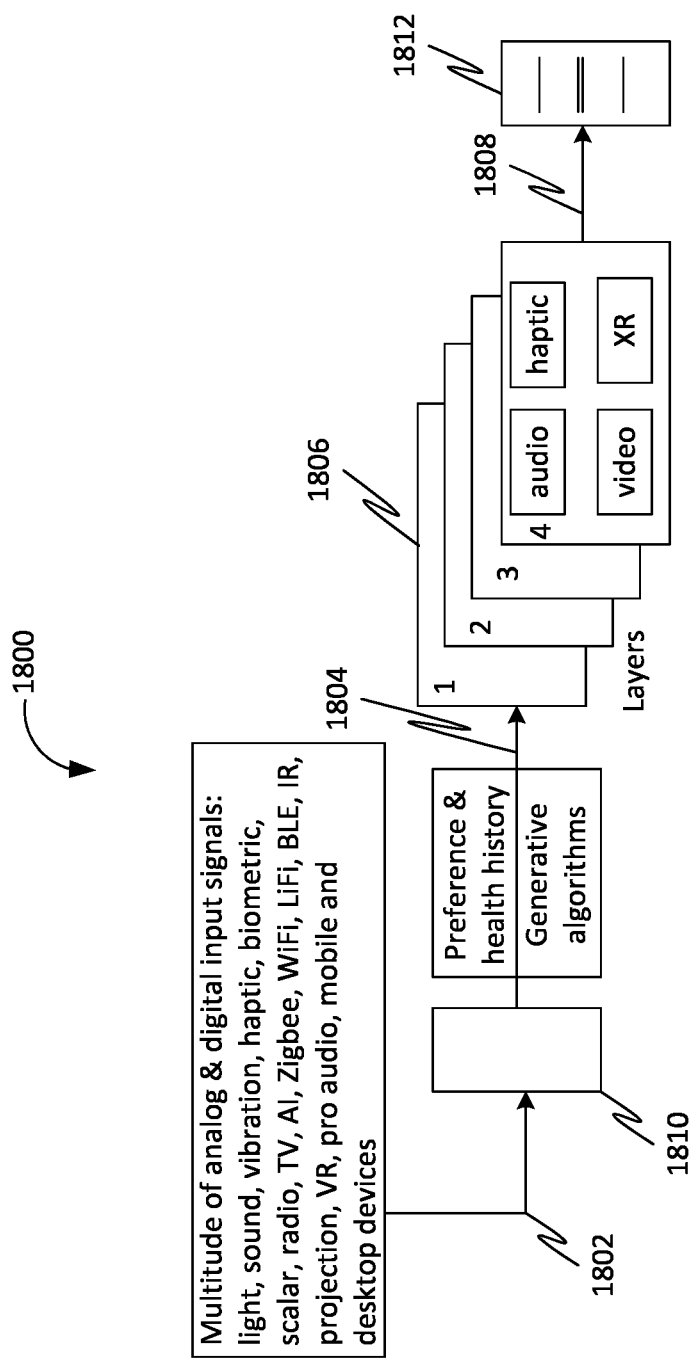
FIG. 18 is a flow diagram of a method for algorithmically generating personalized content by preset relationships for providing content to viewers for enhancing wellbeing of the viewers, in accordance with some embodiments.

FIG. 18 is a flow diagram of a method 1800 for algorithmically generating personalized content by preset relationships for providing content to viewers for enhancing wellbeing of the viewers, in accordance with some embodiments. Further, the personalized content may be algorithmically generated by preset relationships or variables determined individually or in combination by AI, server, or other user generated broadcaster. Accordingly, at 1802 of the method 1800 multitude of analog & digital input signals may be received from light, sound, vibration, haptic, biometric, scalar, radio, TV, AI, Zigbee, WiFi, LiFi, BLE, IR, projection, VR, pro audio, mobile and desktop devices.

Further, at 1804 of the method 1800, the multitude of analog & digital input signals may be processed based on preference and health history and generative algorithms using a local, remote, or web processing device 1810. Further, at 1806 of the method 1800, layers of Audio, Visual, Haptic, XR, or other Consumable Content are generated and Individually or in Combination is Uniquely placed or Augmented onto a base layer of which is determined size, layout, format, color, frequency, vibration, music key, tone, beat per minute, displacement, orientation, phase, amplitude, pulse width, modulation, prilling, sequence, geometry, network connection, and any relevant output. Further, at 1808 of the method 1800, the generated content may be transmitted to a Multitude of analog & digital output devices 1812 such as light, sound, vibration, haptic, biofeedback, scalar, radio, tv, binaural, multi-phase, Zigbee, WiFi, LiFi, BLE, IR, projection, IoT, Virtual Assistant, AI/VR, mobile and desktop devices in-home or in air/road travel environments. Further, user responses in real time, before, during & after experience are logged, categorized, and distributed to a database or ledger for instant use in the content generation loop. This data can be transferred or accessed by a wearable or otherwise connected device for secure access and programming.

Figure 19:
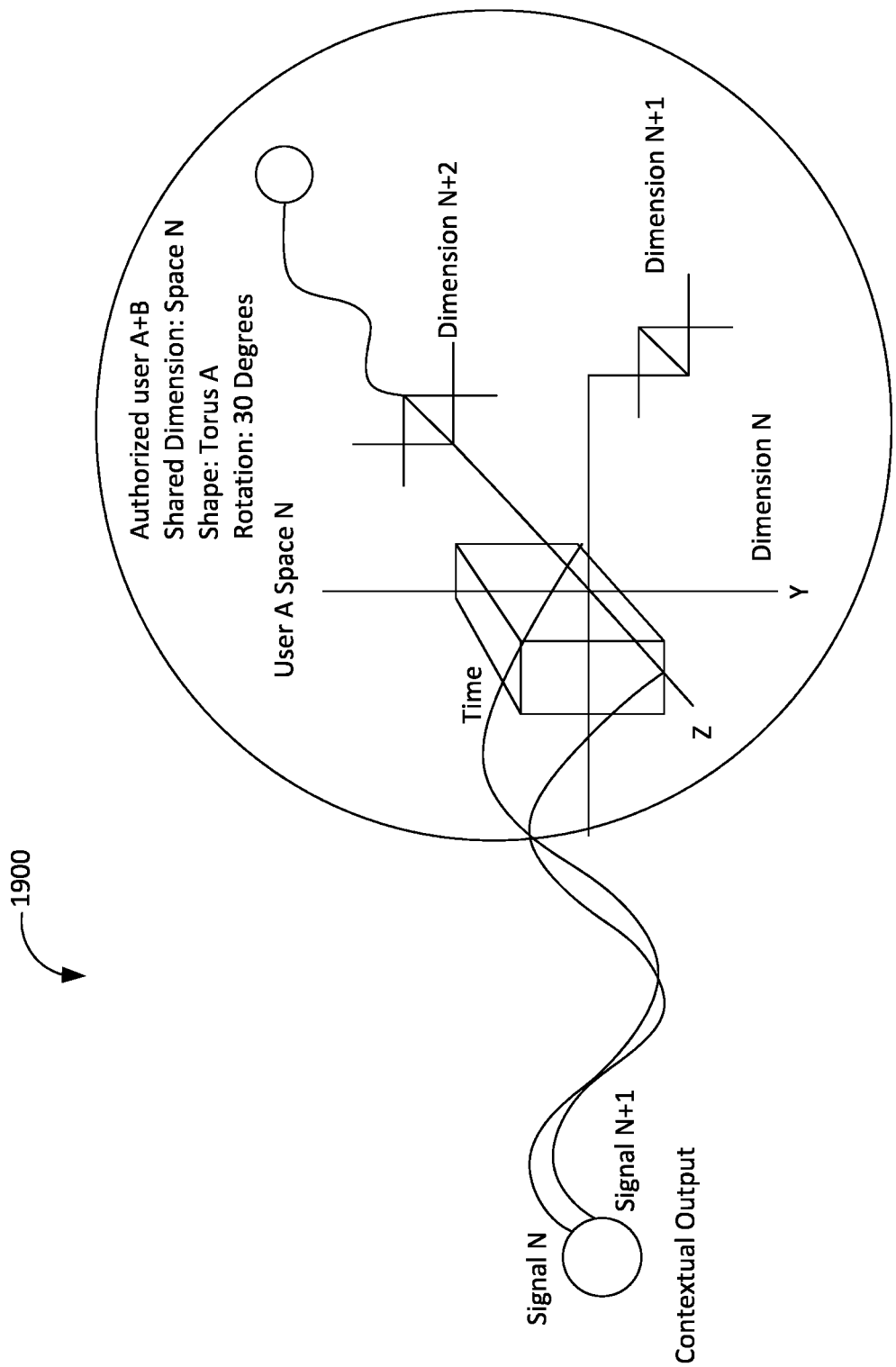
FIG. 19 is a visual representation of traveling of signals into a dimensional space for facilitating generating of the content for viewers for enhancing wellbeing of the viewers, in accordance with some embodiments.

FIG. 19 is a visual representation 1900 of traveling of signals into a dimensional space for facilitating generating of the content for viewers for enhancing wellbeing of the viewers, in accordance with some embodiments. Further, real time signals associated with a broadcaster are filtered based on available outputs, preferences, and data preferences. Further, digital representations of the real time signals are generated and the output is based on, but not limited to, broadcaster and receiver's hardware and program functions comprising time, coordinate, rotation, prilling, torsion, cymatics, phase, amplitude, faces, vertices, and polygons. Further, evolving waveforms are placed in vectored dimensional space, extruding, deforming, and animating over time to represent a relationship context and an ongoing awareness of users' goals. Further, access and user relationships may be based on authorized identification and/or tokens which allows access to new layers, dimensions, times, and filters.

Although the present disclosure has been explained in relation to its preferred embodiment, it is to be understood that many other possible modifications and variations can be made without departing from the spirit and scope of the disclosure.

What is claimed is:

1. A method for providing content to viewers for enhancing health conditions of the viewers, the method comprising:
receiving, using a communication device, a media content from a broadcaster device;
receiving, using the communication device, at least one broadcaster preference from the broadcaster device, wherein the at least one broadcaster preference comprises at least one viewer context variable;
generating, using a processing device, an augmented media content for the enhancing of the health conditions of a viewer based on the at least one viewer context variable and the media content, wherein the augmented media content comprises the media content and the at least one viewer context variable;
transmitting, using the communication device, the augmented media content to a viewer device, wherein the viewer device is configured for presenting the augmented media content to the viewer, wherein the presenting of the augmented media content on the viewer device is based on at least one viewer context value corresponding to the at least one viewer context variable, wherein the at least one viewer context variable corresponds to at least one viewer sensor comprised in the viewer device, wherein the at least one viewer sensor is configured for generating the at least one viewer context value for the at least one viewer context variable based on detecting a response of the viewer corresponding to the augmented media content;

transmitting, using the communication device, the augmented media content to the broadcaster device;

receiving, using the communication device, the at least one viewer context value corresponding to the at least one viewer context variable from the viewer device;

analyzing, using the processing device, the at least one viewer context value and the at least one viewer context variable corresponding to the at least one viewer context value using at least one first machine learning model;

generating, using the processing device, a health data for the viewer based on the analyzing of the at least one viewer context value, wherein the health data includes a health profile of the viewer;

storing, using a storage device, the health data of the viewer in a distributed ledger;

retrieving, using the storage device, a plurality of health data of a plurality of viewers;

analyzing, using the processing device, the plurality of health data;

generating, using the processing device, the plurality of augmentation content based on the analyzing of the plurality of health data; and storing, using the storage device, the plurality of augmentation content in the at least one database.

2. The method of claim 1, wherein the detecting of the response comprises detecting a change in at least one of a physical state, a psychological state, and a biological state of the viewer, wherein the generating of the at least one viewer context value for the at least one viewer context variable is further based on the detecting of the change in at least one of the physical state, the psychological state, and the biological state of the viewer.

3. The method of claim 1, wherein the detecting of the response comprises detecting an expression of the viewer corresponding to the augmented media content, wherein the generating of the at least one viewer context value for the at least one viewer context variable is further based on the detecting of the expression of the viewer corresponding to the augmented media content.

4. The method of claim 1 further comprising:
retrieving, using the storage device, a plurality of augmentation content from at least one database based on the at least one broadcaster preference;
transmitting, using the communication device, the plurality of augmentation content to the broadcaster device, wherein the broadcaster device is configured to present the plurality of augmentation content; and
receiving, using the communication device, a selection of at least one augmentation content from the broadcaster device, wherein the generating of the augmented media content comprises embedding each of the at least one augmentation content and the at least one viewer context variable in the media content to obtain the augmented media content.

5. The method of claim 1 further comprising:
transmitting, using the communication device, a transactional request for acquiring the health data of the viewer to the viewer device;
receiving, using the communication device, a first response for the transactional request from the viewer device;
analyzing, using the processing device, the health data of the viewer based on the first response;
determining, using the processing device, a value of the health data of the viewer based on the analyzing of the health data;
generating, using the processing device, a number of cryptocurrency tokens for the health data based on the value of the health data; and
transmitting, using the communication device, the number of cryptocurrency tokens to the viewer device, wherein the storing of the health data is based on the transmitting of the number of cryptocurrency tokens.

6. The method of claim 5, wherein the generating of the number of cryptocurrency tokens comprises minting the number of cryptocurrency tokens for the health data based on the value of the health data.

7. The method of claim 1, wherein the analyzing of the plurality of health data comprises analyzing the plurality of health data using at least one machine learning model, wherein the generating of the plurality of augmentation content is based on the analyzing of the plurality of health data using the at least one machine learning model.

8. The method of claim 1 further comprising:
receiving, using the communication device, at least one viewer data associated with the viewer from the viewer device;
analyzing, using the processing device, the at least one viewer data using at least one second machine learning model;
determining, using the processing device, at least one requirement of the viewer for the enhancing of the health conditions of the viewer and the at least one viewer context variable corresponding to the at least one requirement based on the analyzing of the at least one viewer data;
identifying, using the processing device, a selection of at least one first augmentation content from the plurality of augmentation content based on the at least one requirement; and
embedding, using the processing device, each of the at least one first augmentation content and the at least one viewer context variable in the media content to further obtain the augmented media content for the enhancing of the health conditions of the viewer.

9. A system for providing content to viewers for enhancing health conditions of the viewers, the system comprising:
a communication device configured for:
receiving a media content from a broadcaster device;
receiving at least one broadcaster preference from the broadcaster device, wherein the at least one broadcaster preference comprises at least one viewer context variable;
transmitting an augmented media content to a viewer device, wherein the viewer device is configured for presenting the augmented media content to a viewer, wherein the presenting of the augmented media content on the viewer device is based on at least one viewer context value corresponding to the at least one viewer context variable, wherein the at least one viewer context variable corresponds to at least one viewer sensor comprised in the viewer device, wherein the at least one viewer sensor is configured for generating the at least one viewer context value for the at least one viewer context variable based on detecting a response of the viewer corresponding to the augmented media content;

transmitting the augmented media content to the broadcaster device; and receiving the at least one viewer context value corresponding to the at least one viewer context variable from the viewer device;

a processing device communicatively coupled with the communication device, wherein the processing device is configured for:

generating the augmented media content for the enhancing of the health conditions of the viewer based on the at least one viewer context variable and the media content, wherein the augmented media content comprises the media content and the at least one viewer context variable;

analyzing the at least one viewer context value and the at least one viewer context variable corresponding to the at least one viewer context value using at least one first machine learning model;

generating a health data for the viewer based on the analyzing of the at least one viewer context value, wherein the health data includes a health profile of the viewer;

analyzing the plurality of health data; and generating the plurality of augmentation content based on the analyzing of the plurality of health data; and a storage device communicatively coupled with the communication device and the processing device, wherein the storage device is configured for storing the health data of the viewer in a distributed ledger, and wherein the storage device is further configured for retrieving a plurality of health data of a plurality of viewers and storing the plurality of augmentation content in the at least one database.

10. The system of claim 9, wherein the detecting of the response comprises detecting a change in at least one of a physical state, a psychological state, and a biological state of the viewer, wherein the generating of the at least one viewer context value for the at least one viewer context variable is further based on the detecting of the change in at least one of the physical state, the psychological state, and the biological state of the viewer.

11. The system of claim 9, wherein the detecting of the response comprises detecting an expression of the viewer corresponding to the augmented media content, wherein the generating of the at least one viewer context value for the at least one viewer context variable is further based on the detecting of the expression of the viewer corresponding to the augmented media content.

12. The system of claim 9, wherein the storage device is further configured for retrieving a plurality of augmentation content from at least one database based on the at least one broadcaster preference, wherein the communication device is further configured for:

transmitting the plurality of augmentation content to the broadcaster device, wherein the broadcaster device is configured to present the plurality of augmentation content; and receiving a selection of at least one augmentation content from the broadcaster device, wherein the generating of the augmented media content comprises embedding each of the at least one augmentation content and the at least one viewer context variable in the media content to obtain the augmented media content.

13. The system of claim 9, wherein the communication device is further configured for:

transmitting a transactional request for acquiring the health data of the viewer to the viewer device;

receiving a first response for the transactional request from the viewer device; and transmitting a number of cryptocurrency tokens to the viewer device, wherein the storing of the health data is based on the transmitting of the number of cryptocurrency tokens, wherein the processing device is further configured for:

analyzing the health data of the viewer based on the first response;

determining a value of the health data of the viewer based on the analyzing of the health data; and generating the number of cryptocurrency tokens for the health data based on the value of the health data.

14. The system of claim 13, wherein the generating of the number of cryptocurrency tokens comprises minting the number of cryptocurrency tokens for the health data based on the value of the health data.

15. The system of claim 9, wherein the analyzing of the plurality of health data comprises analyzing the plurality of health data using at least one machine learning model, wherein the generating of the plurality of augmentation content is based on the analyzing of the plurality of health data using the at least one machine learning model.

16. The system of claim 9, wherein the communication device is further configured for receiving at least one viewer data associated with the viewer from the viewer device, wherein the processing device is further configured for:

analyzing the at least one viewer data using at least one second machine learning model;

determining at least one requirement of the viewer for the enhancing of the health conditions of the viewer and the at least one viewer context variable corresponding to the at least one requirement based on the analyzing of the at least one viewer data;

identifying a selection of at least one first augmentation content from the plurality of augmentation content based on the at least one requirement; and embedding each of the at least one first augmentation content and the at least one viewer context variable in the media content to further obtain the augmented media content for the enhancing of the health conditions of the viewer.

* * * * *